(12) United States Patent
Dorini et al.

(10) Patent No.: US 12,115,729 B2
(45) Date of Patent: Oct. 15, 2024

(54) INFRARED LAMP ASSEMBLY FOR APPARATUS FOR THE LAYER-BY-LAYER FORMATION OF THREE-DIMENSIONAL OBJECTS

(71) Applicant: Stratasys Powder Production Ltd., Huntingdon (GB)

(72) Inventors: Gianluca Dorini, Huntingdon (GB); Anders Hartmann, Huntingdon (GB); Marcel Garrido Barrabes, Huntingdon (GB); Steffen Kongensbjerg Larsen, Huntingdon (GB)

(73) Assignee: Stratasys Powder Production Ltd., Huntingdon (GB)

( * ) Notice: Subject to any disclaimer, the term of this patent is extended or adjusted under 35 U.S.C. 154(b) by 412 days.

(21) Appl. No.: 17/610,153

(22) PCT Filed: Dec. 11, 2020

(86) PCT No.: PCT/GB2020/053177
§ 371 (c)(1),
(2) Date: Nov. 10, 2021

(87) PCT Pub. No.: WO2021/116693
PCT Pub. Date: Jun. 17, 2021

(65) Prior Publication Data
US 2022/0219396 A1    Jul. 14, 2022

(30) Foreign Application Priority Data

Dec. 13, 2019 (GB) ...................................... 1918434
Dec. 13, 2019 (GB) ...................................... 1918435

(51) Int. Cl.
*B29C 64/286* (2017.01)
*B29C 64/153* (2017.01)
(Continued)

(52) U.S. Cl.
CPC .......... *B29C 64/286* (2017.08); *B29C 64/153* (2017.08); *B29C 64/236* (2017.08);
(Continued)

(58) Field of Classification Search
CPC . B29C 64/2886; B29C 64/153; B29C 64/236; B29C 64/282; B29C 64/291; B29C 64/295; B33Y 30/00; B33Y 40/00
See application file for complete search history.

(56) References Cited

U.S. PATENT DOCUMENTS 4,626,659 A    12/1986  Charmes et al.
4,939,629 A *  7/1990  Glanton ................... F21V 7/24
                                                  362/307
(Continued)

FOREIGN PATENT DOCUMENTS

DE        10145650 A1    4/2003
DE     102016205437 A1   10/2017
(Continued)

*Primary Examiner* — Nahida Sultana
(74) *Attorney, Agent, or Firm* — Honigman LLP; Eric J. Sosenko; Jonathan P. O'Brien

(57) ABSTRACT

An infrared lamp assembly for an apparatus for the formation of three-dimensional objects by consolidation of particulate material, the assembly comprising: an elongate infrared lamp extending along a lamp axis, an elongate shield extending parallel to and along one side of the axis of the lamp, and a support structure holding at least one of the ends of the lamp and of the shield, wherein the elongate shield at least partially bounds the space to one side of the lamp, and wherein the assembly provides a lower opening below the lamp and an upper opening above the lamp, such that, in use, radiation generated by the lamp is able to radiate through the openings and away from the lamp in directions not bounded by the shield.

20 Claims, 14 Drawing Sheets

(51) Int. Cl.
  *B29C 64/236* (2017.01)
  *B29C 64/245* (2017.01)
  *B29C 64/282* (2017.01)
  *B33Y 30/00* (2015.01)

(52) U.S. Cl.
  CPC .......... *B29C 64/245* (2017.08); *B29C 64/282* (2017.08); *B33Y 30/00* (2014.12)

(56) References Cited

U.S. PATENT DOCUMENTS

| | | | |
|---|---|---|---|
| 5,031,120 A | | 7/1991 | Pomerantz et al. |
| 5,387,800 A | * | 2/1995 | Kurtich ................. F21V 19/008 |
| | | | 250/493.1 |
| 5,757,112 A | * | 5/1998 | Van Dulmen ............. F26B 3/28 |
| | | | 362/306 |
| 8,278,805 B2 | * | 10/2012 | Monteix ............. H05B 3/0057 |
| | | | 392/422 |
| 10,468,242 B2 | * | 11/2019 | Ranish ................. H05B 3/0047 |
| 11,358,334 B2 | * | 6/2022 | Park ...................... B29C 64/264 |

FOREIGN PATENT DOCUMENTS

| | | |
|---|---|---|
| WO | 2011/071458 A1 | 6/2011 |
| WO | 2019/212484 A1 | 11/2019 |

\* cited by examiner

INFRARED LAMP ASSEMBLY FOR APPARATUS FOR THE LAYER-BY-LAYER FORMATION OF THREE-DIMENSIONAL OBJECTS

CROSS REFERENCE TO RELATED APPLICATIONS

This application is the U.S. national phase of PCT Application No. PCT/GB2020/053177, filed on Dec. 11, 2020, which claims priority to GB 1918434.0 filed Dec. 13, 2019 and GB 191835.7 filed Dec. 13, 2019, the disclosures of which are herein incorporated by reference in their entirety.

FIELD OF THE INVENTION

The present disclosure relates to an infrared lamp assembly for an apparatus for the layer-by-layer formation of three-dimensional (3D) objects, and to apparatus for the layer-by-layer formation of 3D objects comprising such a lamp assembly. The lamp assembly may be particularly suitable for powder bed applications that require infrared radiation that causes thermal preheating and/or consolidation of the particulate material by sintering.

BACKGROUND

Applications such as laser sintering, or so-called "print and sinter" techniques such as high speed sintering, for forming three-dimensional objects from particulate material are receiving increased interest as they are moving towards faster throughput times and become industrially viable. In these processes, the object is formed layer-by-layer from particulate material that is spread in successive layers across a build surface. Each layer of particulate matter is fused, or sintered, over defined regions to form a 'slice' or cross section of the three-dimensional object.

High speed sintering processes, for example, use a high power infrared lamp to sinter areas of particulate material, such as polymer powder, that have been printed with radiation absorptive material (RAM). The RAM enables the printed powder to absorb lamp energy over a wavelength band that is different to the absorption band of the unprinted powder, thus providing selectivity.

One problem that the sintering lamp may cause is that its radiation may excessively heat nearby components, such as the lamp housing. Excessive temperatures can cause ink fumes and airborne particulate matter to stick to and accumulate on surfaces at or near the build bed, causing process issues such as melting and dripping polymer onto the build bed and contaminating the layer. It may also adversely affect the quality and functionality of other parts within the nearby environment; this is because sufficiently hot surfaces turn into secondary radiation sources that may radiate at wavelengths within the absorption band of the unprinted powder. This reduces selectivity of sintering by partially consolidating the unprinted powder, preventing efficient reuse of the unprinted powder, and causing issues with recovering the object from the powder cake. Therefore, the management of heat from the infrared lamps is of importance to provide a reliable process in which accurate consolidation of particulate material, depowdering of the object and recovery of unprinted material may be achieved.

SUMMARY

Aspects of the invention are set out in the appended independent claims, while particular embodiments of the invention are set out in the appended dependent claims.

The following disclosure describes, in one aspect, an infrared lamp carriage for an apparatus for the formation of three-dimensional objects by consolidation of particulate material, the carriage comprising: an elongate infrared lamp extending along a lamp axis; an elongate shield extending parallel to and along one side of the lamp axis, wherein the shield is mounted so as to at least partially bound the space to one side of the lamp; and a lower opening below the lamp and an upper opening above the lamp, such that in use, radiation generated by the lamp is able to radiate through the lower opening and the upper opening and away from the lamp in directions not bounded by the shield.

According to a second aspect, there is provided an apparatus for the formation of three-dimensional objects by consolidation of particulate material, the apparatus comprising a working space, the working space comprising: a build bed surface of particulate material arranged at a lower surface bounding the working space, and a ceiling arranged at an upper surface bounding the working space; and a carriage according to the first aspect for moving the lamp across the build bed surface, wherein, in use, the lower opening is arranged to pass radiation towards the build bed surface, and the upper opening is arranged to pass radiation away from the build bed surface into the working space and towards the ceiling.

According to a third aspect there is provided an infrared lamp assembly for an apparatus for the formation of three-dimensional objects by consolidation of particulate material, the assembly comprising: an elongate infrared lamp extending along a lamp axis, an elongate shield extending parallel to and along one side of the axis of the lamp, and a support structure holding at least one of the ends of the lamp and of the shield, wherein the elongate shield at least partially bounds the space to one side of the lamp, and wherein the assembly provides a lower opening below the lamp and an upper opening above the lamp, such that, in use, radiation generated by the lamp is able to radiate through the openings and away from the lamp in directions not bounded by the shield.

According to a fourth aspect there is provided an apparatus for the formation of three-dimensional objects by consolidation of particulate material comprising a working space, the working space comprising: a build bed surface of particulate material arranged at a lower surface bounding the working space, and a ceiling arranged at an upper surface bounding the working space; and a carriage to which the lamp assembly of the third aspect is mounted and for passing the lamp assembly across the build bed surface, wherein the shield is located between the lamp and surfaces of the carriage facing the lamp, and the at least two openings of the lamp assembly are arranged so that, in use, the lower opening allows radiation to pass towards the build bed surface and the upper opening allows radiation to pass away from the build bed surface into the working space and towards the ceiling.

BRIEF DESCRIPTION OF THE DRAWINGS

Reference is now directed to the drawings, in which.

In the Figures, like elements are indicated by like reference numerals throughout. It should be noted that the illustrations in the Figures are not necessarily to scale and that certain features may be shown with exaggerated sizes so that these are more clearly visible.

DETAILED DESCRIPTION

Figure 1:
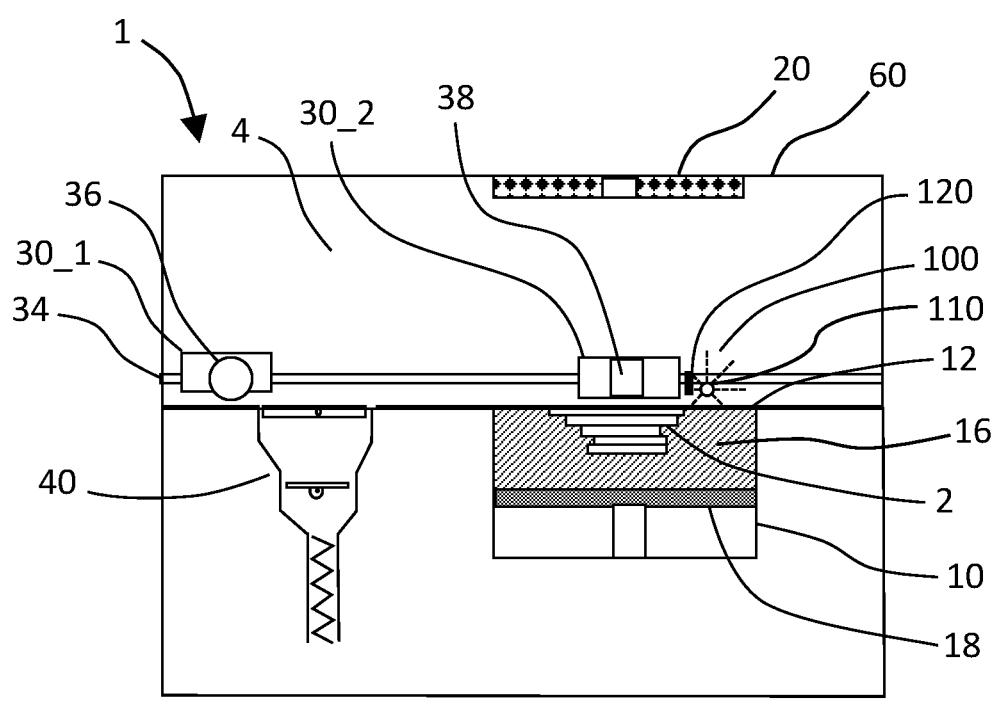
FIG. 1 is a schematic cross-sectional diagram of an apparatus for the layer-by-layer formation of three-dimensional objects, and having a lamp assembly according to an embodiment of the present invention.

Infrared (IR) lamps are conventionally operated as part of an assembly comprising a lamp housing having inner reflective walls and housing the lamp, and a lower opening through which radiation may reach the build bed surface of particulate material in which the object is to be built. The housing conventionally redirects any radiation not directly emitted through the lower opening towards the lower opening by use of downward internal reflectors. The temperature of infrared lamps in a high speed sintering apparatus tends to be well in excess of 1000° C. so that the housing can reach very high temperatures and starts to act as a source of secondary radiation of wavelengths able to be absorbed by the unprinted particulate matter. To prevent excessive heating, such housings may have active cooling, for example fluid cooling units, attached to them, or the housing body may be a hollow body that is fluid cooled. However, such approaches add complexity and weight to the housing. The printer comprises a working space bounded from below by a work surface comprising the build bed surface. Since the housing may be supported on a carriage that is moveable across the work surface and build bed surface, this also adds weight to a moveable component and complexity in integrating a robust fluid supply.

The present inventors have surprisingly found that, by removing the lamp housing and allowing radiation to dissipate freely into the working space above, selectivity can be well maintained during the printing process. A significant amount of secondary radiation reaching the build bed from the housing may reduce and compromise selectivity. It is thus thought that reducing or minimising the thermal mass of a housing (i.e. a housing that is able to store heat) and any significant surface area of surfaces adjacent the lamp and directly facing the build bed surface can preserve or enhance selectivity. In addition, any radiation reflected back from the build bed surface can pass through the open assembly, while the minimal shield surface directly facing the powder bed surface only absorbs a small amount of reflected radiation. Overall, it may be beneficial that the shield is made of a thin sheet of metal, for example 1 mm thin or less, such that it has a low thermal mass and thus is able to cool down quickly when the lamp is switched off.

Thus the removal of the lamp housing to allow lamp radiation to dissipate freely into the space above and providing only minimal heat shielding to nearby components from direct lamp radiation may lead to a significant improvement in the management of secondary radiation reaching the build bed surface. The radiation released upwards, away from the build bed surface, may more easily be managed via the comparatively large ceiling area of the apparatus.

Aspects relating to the infrared lamp assembly and an apparatus for layer-by-layer formation of three-dimensional objects by the aggregation of particulate matter comprising the infrared lamp assembly will now be described with respect to FIGS. 1 to 13.

FIG. 1 shows an apparatus 1 for layer-by-layer formation of three-dimensional objects by the aggregation of particulate matter by high speed sintering, and having a lamp assembly 100 according to an embodiment of the present invention.

The apparatus 1 has a working space 4 bounded from below by a working surface 13 and from the top by a ceiling 60. One or more carriages 30 (in this case two) are arranged to be movable across a build bed surface 12 that is comprised within the working surface 13. The build bed surface 12 is the surface over which successive layers of particulate material, such as powder, are distributed and processed to form cross sections of an object 2. The apparatus 1 further comprises a powder container system 10 with a build bed 16 within which the object 2 is formed, layer by layer, from a build bed surface 12. A powder dosing module 40 is arranged to dose fresh powder to the working surface. The first and second carriages 30_1, 30_2 respectively support a distribution device 36, and a printing module 38 and a lamp assembly 100. The carriages are movable on at least one rail 34 back and forth across the build bed surface 12.

In an illustrative process sequence, the floor 18 of the powder container system 10, and which bounds the bottom surface of the build bed 16, lowers the build bed 16 by a layer thickness.

With the first carriage 30_1 supporting the distribution device 36 located to the far side of the dosing module with respect to the build bed surface 12, and the second carriage 30_2 located on the opposite side of the build bed surface 12 with respect to the first carriage, the dosing module 40 doses an amount of powder to the work surface 13, adjacent the build bed surface 12. The first carriage is moved across the build bed surface 12 so that the distribution device 38 distributes the dosed powder so as to form a thin layer across the build bed surface 12. Next, the first carriage 30_1 moves back to its starting position, followed by the second carriage 30_2. Starting from the dosing module side, the second carriage moves across the build bed surface to the opposite side and the one or more droplet deposition heads of the printing module 38 deposit fluid containing RAM over selected areas of the build bed surface 12 corresponding to the cross section of the object to be formed, and the infrared lamp 110 of the lamp assembly 100 is operated to sinter the printed powder. The process then may start again to proceed layer by layer until the object is fully built.

The infrared lamp 110 achieves very high temperatures in excess of 1000° C., and nearby components require shielding from this heat to ensure they continue to operate reliably. One such component is the carriage to which the lamp assembly 100 is mounted. In some implementations this will be the carriage that also supports the printing module, although a lamp may also be mounted to the carriage supporting the powder distribution device 36. For example, an infrared lamp 110 of a similar assembly 100 could be mounted to the first carriage downstream of the distribution device 38 and operate as a preheat lamp. As the distribution device 38 distributes the powder layer, the preheat lamp 100 is operated to heat the freshly distributed powder layer to near sintering temperature before the second sled is moved across the build bed surface to deposit the RAM and to operate the infrared lamp to sinter the printed powder areas.

In some implementations of the apparatus 1, two lamps may be provided on each carriage, for example one upstream and one downstream of the printhead module, or one upstream and one downstream of the powder distribution device, or two lamps side by side. These two lamps may be used for sintering on both the forward and backward strokes of the carriage, and/or one may be used to preheat and the other to sinter. Since both the preheat function and the sintering function causes the lamp to operate at high temperature, their thermal impact on other components needs to be managed. This may be achieved by providing the preheat and/or sinter lamp within the lamp assembly 100.

An embodiment of the lamp assembly 100 and some variants thereof comprising the infrared lamp 110 will now be illustrated in detail by way of example with reference to FIGS. 2A to 9B.

Figure 2A:
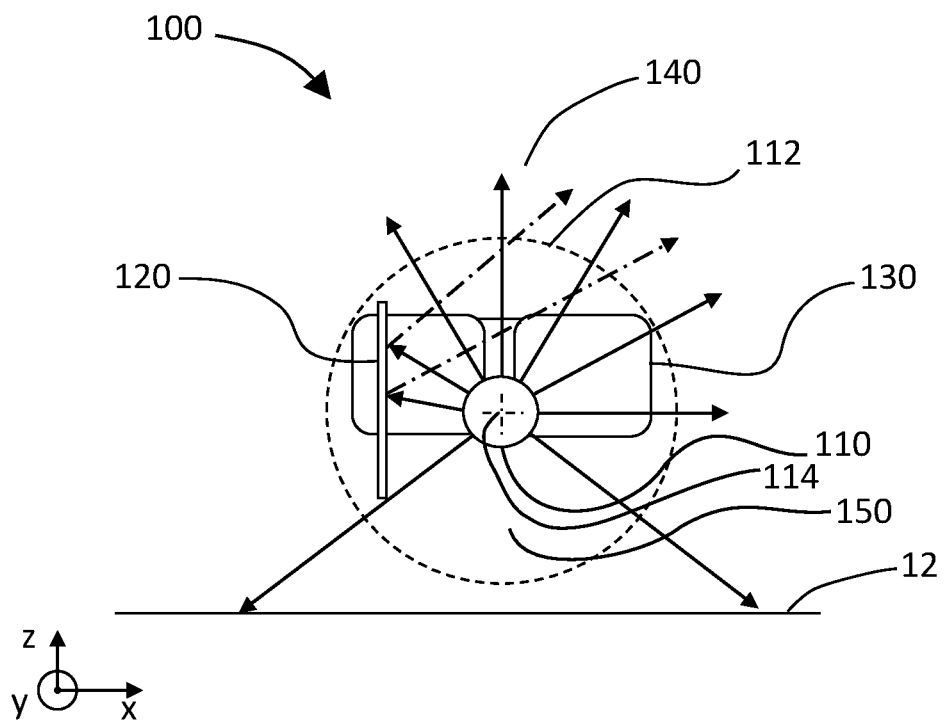
FIG. 2A is a schematic cross section view of a lamp assembly according to an embodiment.
Figure 2B:
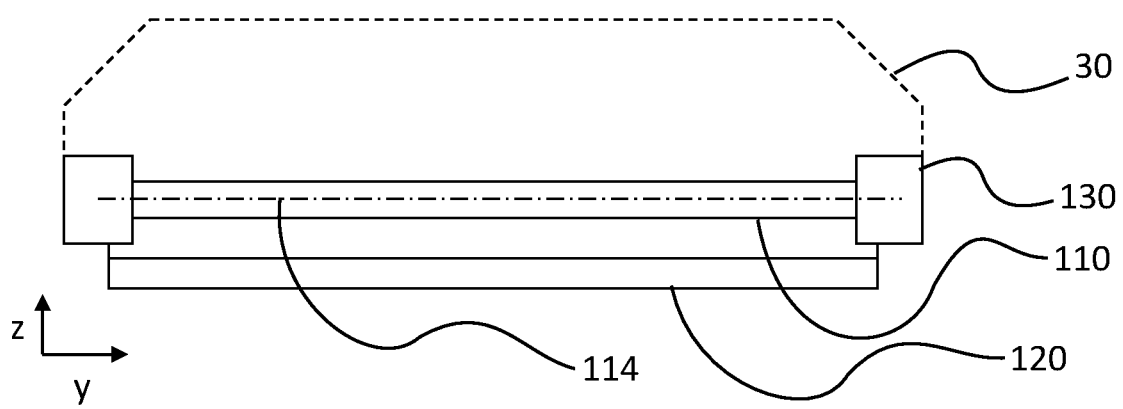
FIG. 2B is a schematic side view of the lamp assembly of FIG. 2A.
Figure 2C:
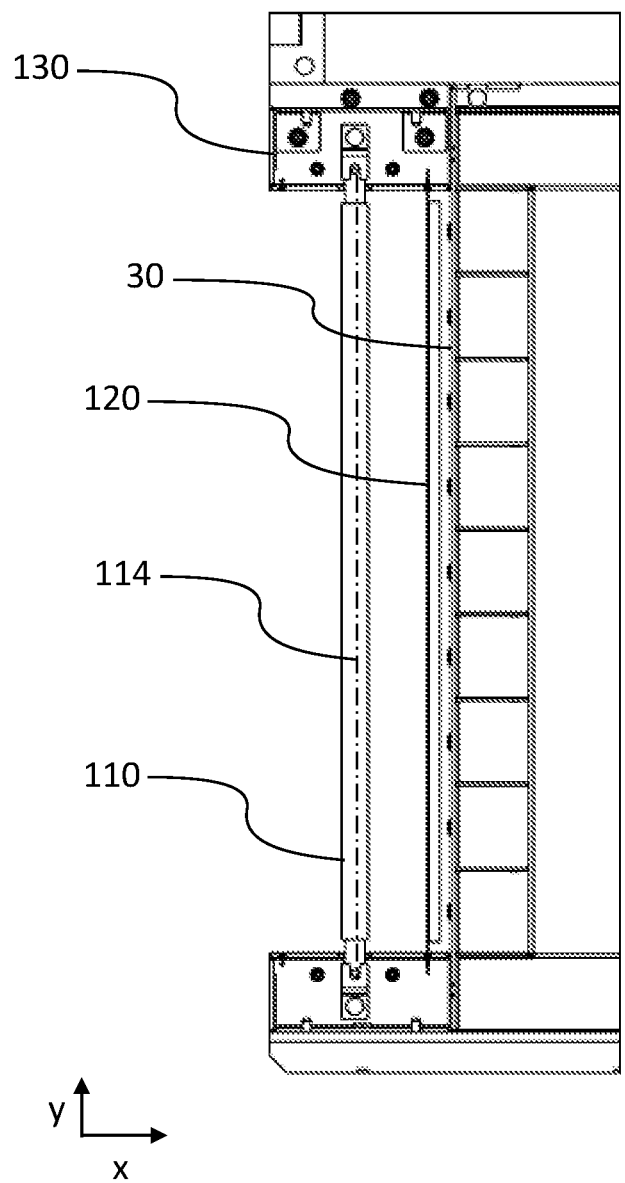
FIG. 2C is a schematic plan view of the lamp assembly of FIG. 2A.

FIGS. 2A to 2C show an infrared lamp assembly 100 according to an embodiment for an apparatus for the formation of three-dimensional objects by consolidation of particulate material, and which may be particularly useful in a sintering apparatus using a laser or an infrared lamp to sinter the material. While the laser sintering process, in which a laser source is used to selectively sinter the powder material, generally does not require a printing module, a preheat lamp as part of an assembly 100 may be provided for example to the carriage supporting the powder distribution device 38.

Accordingly, the infrared lamp assembly 100 comprises an elongate infrared lamp 110 extending along a lamp axis 114, an elongate shield 120 extending parallel to and along one side of the axis of the lamp 110, and a support structure (e.g. frame) 130 holding at least one (and preferably both) of the ends of the lamp 110 and of the shield 120. The elongate shield at least partially bounds the space to one side of the lamp. The assembly provides a lower opening 150 below the lamp and an upper opening 140 above the lamp, such that there is no significant obstruction in the space above and below the lamp within the assembly. In this way, radiation generated by the lamp is able to radiate through the openings 140, 150 and away from the lamp in directions not bounded by the shield 120.

In the present disclosure, radiation may mean direct, primary radiation emitted by the lamp, lamp radiation reflected upwards by the shield, primary radiation emitted by the lamp and reflected back from the powder bed surface 12 into the lower opening, and secondary radiation emitted from the surface of the hot lamp 110 or other hot surfaces, for example surfaces heated by the lamp.

As illustrated, the support structure 130 may hold both the ends of the lamp 110 and both the ends of the shield 120. Advantageously, this gives improved structural rigidity to the assembled components, including the lamp 110 and the shield 120. However, alternative embodiments of the assembly 100 may employ a support structure that holds only one end of the lamp 110 and/or only one end of the shield 120, provided the lamp 110 and/or shield 120 are securely supported from that one end, and the lamp is of a type that is powered from only one end.

FIGS. 2A to 2C show the lamp assembly 100 in greater detail. The infrared lamp 110 may be an elongate lamp such as a tube emitter, such as a 3000 W, 400V reflector-type Victory lamp, but not limited to such, supported at one or both of its ends by the support structure (e.g. frame) 130. Alongside the lamp, an elongate shield 120 is mounted to the support structure so that its direction of elongation extends parallel to the lamp axis 114. This is illustrated in a schematic plan view of the assembly in FIG. 2C. When mounted to a carriage 30 above a build bed surface 12 within the apparatus 1, the shield surface may be further oriented so that it extends substantially vertically upwards, along a direction perpendicular to the lamp axis (the z-direction in FIG. 2A), as also indicated in the cross sectional schematic in FIG. 2A, where it is shown how the lamp assembly 100 may be positioned above a build bed surface 12. The lamp axis 114 and elongate direction of the shield 120 meanwhile extend parallel to the build bed surface 12, as is illustrated in a schematic side view of the assembly in FIG. 2B. In this way, the assembly 100 provides a shield 120 mounted to one side of and parallel to the lamp axis 114, and an upper opening 140 above and a lower opening 150 below the lamp, such that the lamp can radiate through the lower opening and through the upper opening of the assembly. When the assembly is mounted in the apparatus 1, radiation is able to radiate towards the build bed surface 12 through the lower opening 150, and unimpeded upwards into the working space 4 through the upper opening 140, where the working space 4 is bounded above by ceiling 60. At the same time, there is minimal shield surface directly facing the powder bed surface 12, so that any secondary radiation emitted from the shield 120 cannot significantly affect the temperature of the unprinted (white) powder and thus compromise the selectivity of consolidating the printed and unprinted powder.

During operation of the apparatus, in a high speed sintering machine for example, the working space is filled with ink fumes and powder dust, which settle on any surfaces and accumulate, turning them dull or even black. Within a cylindrical envelope about the lamp axis 114, defined by the lamp power, all or at least a significant amount of organic matter is pyrolised due to the high temperature of the lamp, preventing it from settling and accumulating on surfaces located within this envelope. This envelope is here referred to as the vaporisation front 112 of the lamp 110, as indicated for example in FIG. 2A, within which, in an oxygen containing atmosphere for example (as may typically be the case in a high speed sintering printer), temperatures to achieve pyrolysis of polymer powder may need to be 300° C. or higher. It should be noted that the vaporisation front 112 is a function of lamp power, so that depending on the lamp type and/or operation of the lamp the size of the front may change. During a sintering step at high duty cycle (e.g. 100% for a 3000 W lamp), the vaporisation front may extend radially to 200 mm or less from the lamp axis.

In the apparatus shown in FIG. 1, the lamp radiation reflected by the shield, or radiation reflected back from the build bed surface onto the inner surface(s) of the shield and reflected upwards, is further able to radiate freely away from the shield surface. Radiation can however not directly reach at least the nearmost surfaces of the carriage 30 since the shield 120 blocks direct radiation from the lamp, or radiation reflected from the build bed surface towards the inner surface(s) of the shield(s), from reaching the nearmost surfaces of the carriage.

In an apparatus for the formation of three-dimensional objects, |x| is the direction of travel of the carriage, z is vertical height up from the build bed surface 12 and y (into the page in FIG. 1 and FIG. 2A) is the direction of elongation of the lamp and shield, such that the lamp axis 114 is parallel to the y-axis.

Tilted and Curved Single Shields

It is not essential, when mounted to the carriage 30, that the shield surface extends substantially vertically upwards from the build bed surface 12. Lamp assemblies 100 having alternative configurations and arrangements of shields 120 with respect to the build bed surface 12 are illustrated in FIGS. 3A and 3B.

Figure 3A:
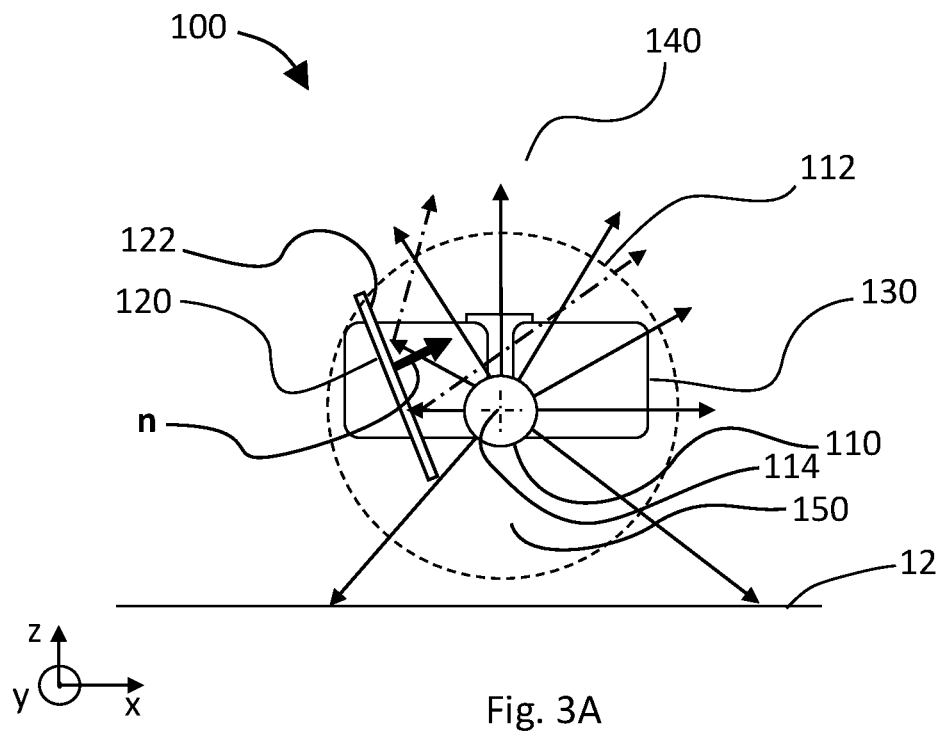
FIGS. 3A and 3B are schematic cross section views of alternative arrangements of the shield of the lamp assembly.

In FIG. 3A, the shield 120 is a planar sheet located within the lamp vaporisation front 112. The support structure (e.g. frame) 130 supporting the shield 120 and the lamp 110 is mounted to the carriage 30 such that the nearmost surfaces of the carriage facing the shield 120 are located outside of the lamp vaporisation front 112. When installed in the apparatus 1, the shield 120 extends upwards at an angle to the vertical to the build bed surface 12, so that its upper edge leans away from the lamp axis 114 and towards the carriage, and its lower edge leans towards the lamp axis 114.

In a variant to the shield of FIG. 3A, the shield 120 may comprise an elongate sheet of a curved, concave cross section, when viewed along the lamp axis 114, and arranged within the assembly so that the concave surface faces the lamp 110. The cross section of curvature may describe the section of a circle, or it may describe a parabolic curve, or any other concave curvature or shape. The concave surface need not be a smooth surface, but may instead be made up of a series of discrete planar elongate strips attached to one another along their adjacent elongate edges at fixed or varying angle from strip to strip, to form an overall curved, concave cross section. The purpose of the curvature is to guide radiation upwards and away from the lamp into the working space 4. Where a focus may be defined, for e.g. circular or parabolic cross sections, the focus of the curvature may be concentric with the lamp axis 114, or it may be offset from the lamp axis 114.

Figure 3B:
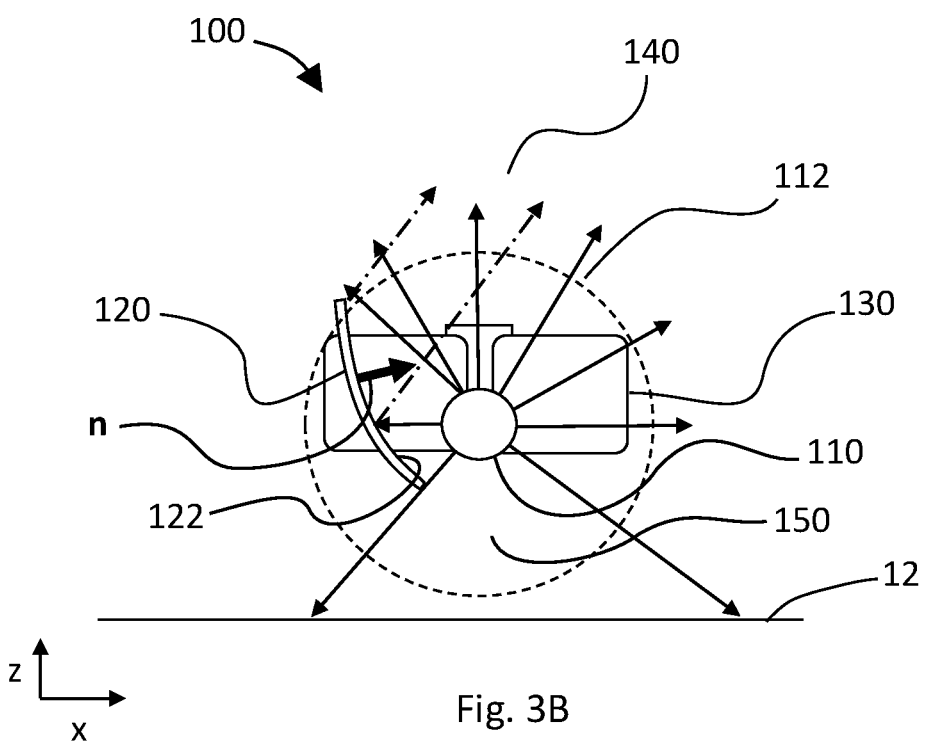

In the implementations shown in FIGS. 3A and 3B, a normal n to the shield surface facing the lamp 110 may be defined. Such a normal n generally has a non-zero vertical component. The non-zero vertical component causes lamp radiation to be directed upwards at overall steeper angles compared to radiation reflected by the vertical sheet shield 120 of FIG. 2A (and for which the vertical component of the normal to the shield surface is zero). This restricts the lower opening 150 through which radiation can reach the build bed surface 12, and through which direct radiation reflected back from the powder may be redirected upwards and out of the upper opening 140, which is widened compared to the vertical shield of FIG. 2A. In addition, a higher proportion of lamp radiation compared to the vertical shield 120 of FIG. 2 is reflected upwards into the working space 4 by the shield 120. The arrangements of the shield 120 in FIGS. 3A and 3B define an upper opening 140 that is larger than the lower opening 150, so that more radiation is directed upwards and away from the lamp 110 compared to the radiation emerging from the assembly 100 of FIG. 2.

Dominant Surface

The shields 120 of the various embodiments and implementations described herein may be thought of as comprising a dominant surface 122, which may comprise more than 50% of the shield surface, and which has the primary function to direct radiation generated by the lamp 110 out of the upper opening 140 of the assembly 100, so that, in the apparatus, the radiation may radiate unimpeded by obstructions above the upper opening 140 into the working space 4 and away from the build bed 16 to remove heat from the vicinity of the lamp 110. The dominant surface 122 is further arranged to reflect any direct lamp radiation, and any lamp radiation reflected back from the build bed surface 12 into the lower opening 150, towards and out of the upper opening 140. Thus unlike conventional downwards focusing reflector housings used with infrared lamps that focus lamp radiation towards the build bed surface 12, the assembly 100 dissipates a substantial amount of radiation upwards and away from the lamp 110 into the working space 4.

The dominant surface 122 may generally have a lower and upper elongate edge that defines, or contributes to defining, the extent of the upper opening 140 and the extent of the lower opening 150. Furthermore, the dominant surface 122 may comprise two or more surfaces of distinct shape or configuration, for example two elongate surfaces adjoint along a respective one of their elongate edges and arranged at an angle towards one another, and where both surfaces in combination have the function to dissipate radiation through the upper opening 140 of the lamp assembly 100.

With respect to the shields 120 shown in FIGS. 3A and 3B, the dominant surface 122 may be angled with respect to the vertical, or the dominant surface may be curved, such that the dominant surface 122 has a normal with a non-zero vertical component. In the implementations described herein, it is preferable that the area of any angled or curved surface facing the build bed 16 is sufficiently small to avoid significant amounts of secondary radiation being directed at the build bed surface 12.

Returning to FIG. 2A, the dominant surface of the shield 120 is simply that of an elongate plane that may be described as being arranged as a tangent plane to a cylindrical envelope of constant power of the lamp 110. The upper and lower edges of the dominant surface (here shield 120), in the length direction of the shield, are arranged parallel to the contact line between the plane of the shield and the envelope. Since the shield only extends a finite amount perpendicularly away from the contact line in either direction, it may be thought of as only partially, and not wholly, bounding the space to one side of the lamp. In other words, when mounted in the apparatus 1, the sheet does not extend infinitely in a vertical direction away from the powder bed surface 12.

In the case of a single shield 120 having a planar elongate sheet as dominant surface 122 therefore, the lamp 110 may be mounted to the support structure (e.g. frame) 130 so that the planar dominant surface 122 of the shield forms a tangent plane to the surface of a cylindrical constant power envelope centred about the lamp axis 114. Optionally, the planar dominant surface 122 may extend by different amounts to either side of the contact line between the tangent plane and the constant power envelope. In other words, the lamp 110 is located closer towards one elongate edge of the planar surface. When the assembly is mounted to the carriage 30 within the apparatus 1, this may mean that the lamp 110 is located closer to the lower opening 150 than to the upper opening 140.

By mounting the shield 120 with respect to the lamp axis 114 so that the lamp axis 114 is closer to the lower opening 150 of the shield 120 than to the upper opening 140, the angle over which the lamp can irradiate the build bed surface 12 is increased.

Two Shields

In some implementations, a second shield 120_2 may be provided to extend alongside the lamp 110, wherein the support structure (e.g. frame) 130 holds the ends of the second shield 120_2, so that the second shield extends parallel to the lamp axis and opposite the first shield so that the lamp 110 is located between the shields. The infrared lamp assembly 100 may thus comprise the elongate infrared lamp 110 having a lamp axis 114, two elongate shields 120_1, 120_2 extending parallel to and along the axis 114 of the lamp 110, and a support structure (e.g. frame) 130 holding at least one (and preferably both) of the ends of the lamp 110 and of the two shields 120_1, 120_2. The support structure 130 locates the first and second shield alongside the lamp 110 and on opposite sides of the lamp; in other words, the lamp 110 is located between the shields 120_1, 120_2. The elongate shields at least partially bound the space to either side of the lamp 110. The assembly 100 thus provides a lower opening 150 below the lamp 110 and an upper opening 140 above the lamp 110, such that there is no significant obstruction in the space above and below the lamp 110 within the assembly 100. In this way, radiation generated by the lamp 110 is able to radiate through the upper and lower openings 140, 150 and away from the lamp 110 in directions not bounded by the shields 120_1, 120_2. By providing a second shield, the radiation of the lamp 110 is partially bound on both sides of the lamp, 'partially' meaning that either shield only finitely extends perpendicular to the direction of elongation and this cannot block all radiation.

When mounted to a carriage 30 in the apparatus 1, this means that the shields 120_1, 120_2 may be arranged so that the inner shield 120_1 blocks some of the direct lateral radiation from the lamp 110 reaching near most surfaces of the carriage 30, and the outer shield 120_2 blocks some of the direct lateral radiation from reaching nearby surfaces of components located near the opposite side of the lamp 110. For example, as the carriage 30 moves back and forth across the build bed surface, it may bring the lamp 110 into close proximity with other components, such as components located near or at extreme positions of its travel. In some implementations of the apparatus 1, the carriage 30 may comprise another module downstream of the lamp assembly 100 that needs to be protected, for example a thermal sensor module. Where the apparatus 1 comprises a second carriage 30 that moves independently of the first carriage 30, and located on the other side of the lamp 110, such that as the second carriage 30 moves towards the first carriage 30 (or vice versa) the lamp 110 moves into close proximity of the second carriage and thus the second carriage needs to be shielded from the lamp's direct irradiation to prevent it from heating up excessively. In some apparatus, the lamp assembly 100 may be mounted between other components on the carriage 30, so that the two shields 120_1, 120_2 may be configured to block some of the direct lateral radiation from the lamp 110 reaching the near most surfaces of the carriage 30 or the components mounted on it.

Optionally, depending on the configuration of the apparatus, the second shield 120_2 may further, or instead, be arranged to limit direct lamp radiation reaching a viewer window into the apparatus 1.

Combinations of the various variants of the shields may be used for the two shields in the same assembly. In other words, any variant of the shield as described herein may equally apply to both shields (arranged as mirror images); or in assemblies where two shields are provided, one shield may represent one variant while the other shield represents a different variant.

Figure 4A:
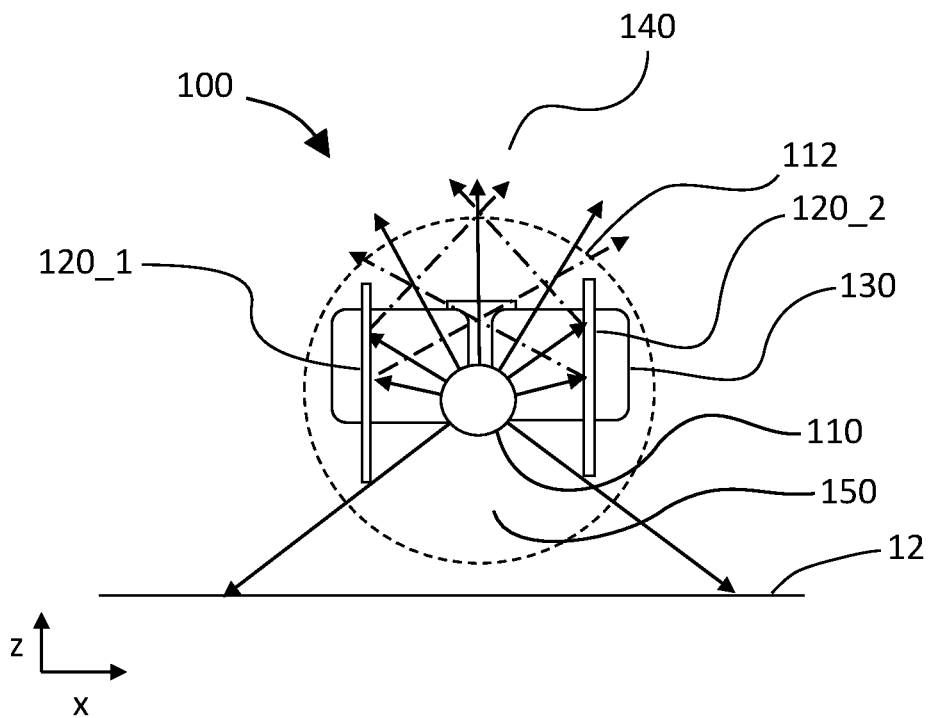
FIGS. 4A and 4B are schematic cross section views of arrangements of lamp assembly having two shields.
Figure 4B:
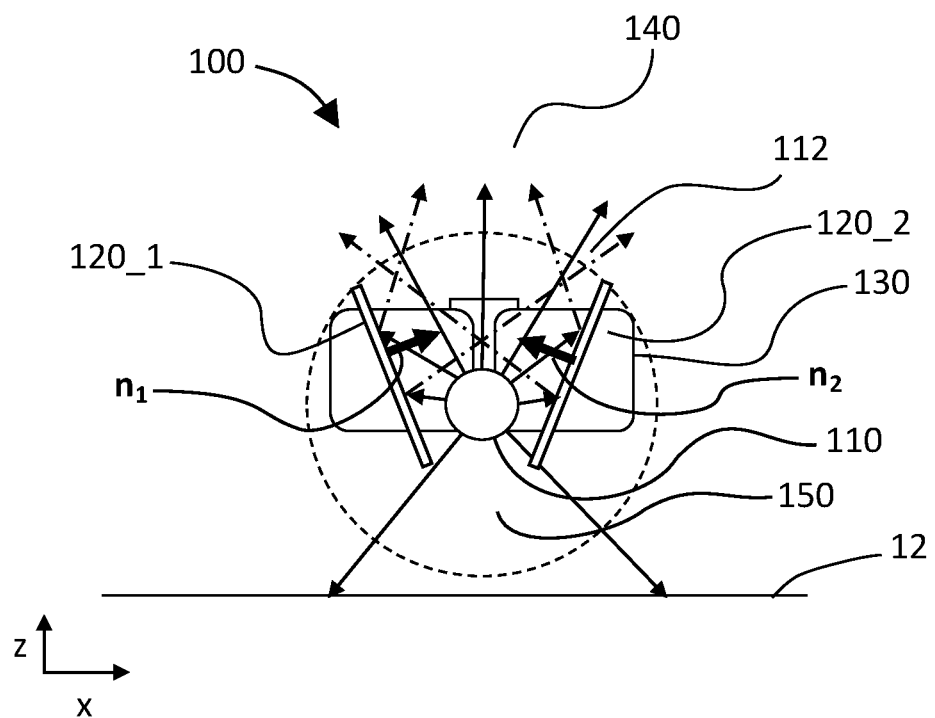

Variants of lamp assemblies 100 comprising two shields are illustrated in FIGS. 4A and 4B. FIG. 4A illustrates a cross sectional view of a lamp assembly 100 in which the axis 114 of the lamp 110 extends parallel between two planar elongate sheets, forming the dominant surfaces and representing the shields 120_1 and 120_2. The support structure (e.g. frame) 130 locates the shields within the lamp's vaporisation front 112. The lamp 110 is located equidistantly between the dominant surfaces and, in this implementation, also closer to the lower opening 150 (here shown as the opening facing build bed surface 12) compared to the upper opening 140.

In some implementations, at least one of the shields may comprise a dominant surface that is planar. The surfaces of the planar sheets may be arranged parallel to one another. In alternative configurations, each shield may comprise a dominant surface and the dominant surfaces of two shields are non-parallel to one another. The lamp 110 may be located by the support structure 130 with its axis 114 parallel to both sheets, and preferably centrally between the sheets, so that the lamp axis 114 is equidistant from each sheet surface. In some implementations, the lamp axis 114 may be located closer to the lower opening 150 and away from the upper opening 140, or alternatively partially below the lower opening 150. By locating the lamp 110 nearer the lower opening 150, or partially below it, the extreme angles at which radiation may emerge from the lower opening 150, which may also be referred to as the field of view of the lamp 110, is increased.

In alternative implementations, such as the one shown in FIG. 4B, the dominant surfaces of the two planar sheets (shields 120_1 and 120_2) are angled towards one another such that the lower edges of the sheets are closer to one another than the upper edges of the sheets, and such that the upper opening 140 is larger than the lower opening 150.

In other implementations (not shown), the dominant surface may not be planar, but may comprise or consist of a curved cross section having a concave portion facing the lamp 110, similar to the curved sheet described with respect to FIG. 3B. The two shields are each comprised at least partially of an elongate sheet of curved, concave cross section, so that the concave surfaces face the lamp 110. The cross section of curvature of each dominant surface may describe the section of a circle or it may describe a parabolic curve, or any other concave curvature or shape. The curve need not be a smooth curve, but may instead be formed from a series of planar elongate strips attached to one another along adjacent elongate edges, at fixed or varying angle from strip to strip.

Where the curvature may be defined in terms of a focal point, the line focus of the curved portion (for e.g. circular or parabolic cross sections) may be coincident with the lamp axis 114, or it may be offset from the lamp axis 114. In these implementations the different arrangements of curvature are intended to achieve an upper opening 140 through which radiation may freely exit the assembly 100 and that may redirect radiation towards and out of the upper opening 140.

For two tilted and/or curved shields arranged to either side of the lamp 110, and in contrast to the two vertical shields described with respect to FIG. 4A, the normal n to the shield surface facing the lamp 110 has a non-zero vertical component. For upwards opening shield pairs 120_1, 120_2, such as the pair shown in FIG. 4B, or for a similarly arranged shield pair with a curved concave portion, lamp radiation not emerging through the lower opening 150 is directed upwards through the upper opening 140 at overall steeper angles compared to radiation reflected by the vertical sheet shields of FIG. 4A (and for which the vertical component of the normal to the shield surface facing the lamp is zero).

The first shield, i.e. the shield that is to be mounted nearer the carriage (also referred to here as the 'inner shield' when located on the carriage), in these cases comprises a concave or tilted sheet surface facing the lamp that may be defined by one or more normals $n_1$ to the surface for which the x and z components are positive, $n_1=(+x, y=0, +z)$. For the second shield, or 'outer shield' when the assembly is mounted to the carriage, the concave or tilted sheet surface facing the lamp may be defined by one or more normals $n_2$ to the surface for which the x component is negative, $n_2=(-x, y=0, z)$.

Lamp Location with Respect to Shields

Regardless of whether the shield has a planar or concave portion with respect to the lamp axis 114, the lamp axis 114 may be located nearer the lower edges of the shields and away from the upper edges of the shields. For shields comprising dominant surfaces having upper edges that are further apart than their lower edges, defining a larger upper opening 140 compared to the lower opening 150, the lamp axis 114 may be located near, at, or partially above the plane connecting, i.e. defined by, the divergent, upper edges of the dominant surfaces of the shields.

Alternatively, the lamp axis 114 may be located near, at, or partially below the plane connecting, i.e. defined by, the convergent, lower edges of the dominant surfaces of the shields. In other words, the upper edges of the sheets are further apart from one another compared to the lower two edges, so that that the upper opening 140 is larger compared to the lower opening 150. While the upper opening 140 may be enlarged in this way, the field of view of the lamp 110 with respect to the lower opening 150 may be increased by moving the lamp 110 closer to the lower opening 150 than to the upper opening 140, or even partially below the lower opening 150, so that when the assembly 100 is mounted in the apparatus 1, a sufficient area of the build bed surface 12 may receive direct lamp radiation.

Outward Lower Lips

Preferably, as discussed above, the shield is made of thin metal sheet or other thin material that dissipates heat easily. Preferably it also has a low coefficient of thermal expansion to prevent material stresses in the shield as it experiences extreme temperature cycles during operation of the lamp 110. In this way, the shield may remain parallel to the lamp 110 during temperature cycling. In addition, the shield preferably has a suitable stiffness to retain its shape during the motion of the carriage 30. Shields made of thin sheet may flex during the process of object build, and it may be beneficial to provide a strengthening lip to one or both of the elongate upper and/or lower edge of the shield. Examples of a strengthening lip are shown in FIGS. 5 to 7.

Figure 5A:
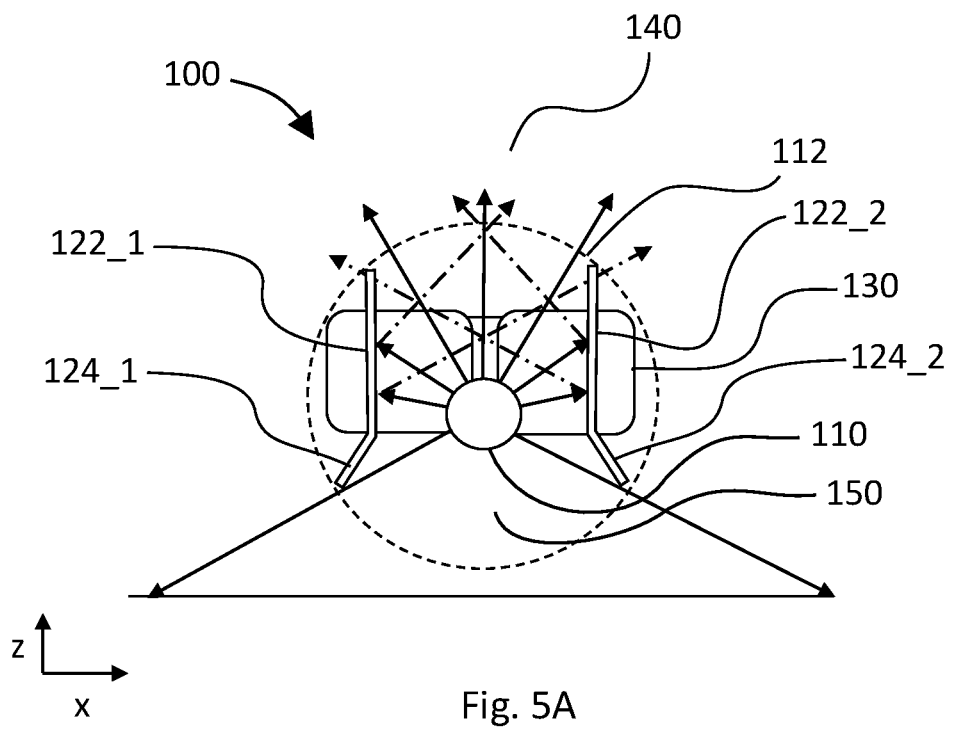
FIG. 5A is a schematic cross section view of a lamp assembly in which the shield comprises a flange along the lower edge.
Figure 5B:
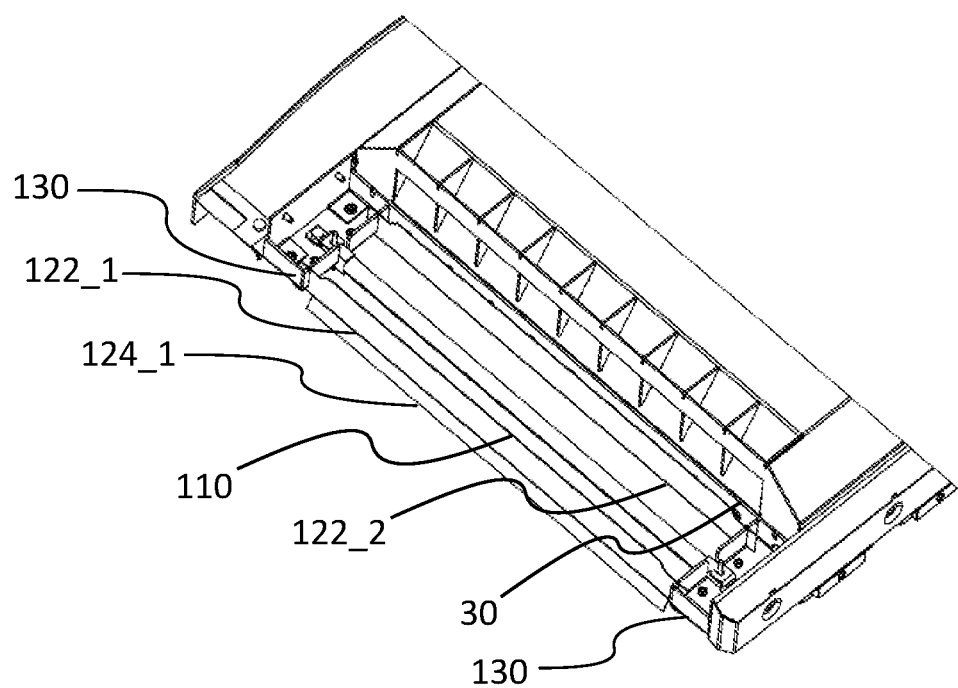
FIG. 5B is a three-dimensional illustration of an implementation of the arrangement of FIG. 5A.

FIG. 5A shows a schematic cross section of the lamp assembly 100 of FIG. 3A, in which a lip 124 is provided to the lower edge of each planar sheet 122_1, 122_2 of respective shields 120_1 and 120_2. FIG. 5B shows a three-dimensional illustration of the lamp assembly 100 of FIG. 5A. As may be seen, the lip 124_1, 124_2 extending from the lower edges of the respective dominant surface 122_1, 122_2 is angled outwards with respect to the lamp 110. The angle and extent of the lip 124_1, 124_2 may be chosen to provide stiffness to the sheet forming the dominant surface 122_1, 122_2 that is sufficient to ensure that the dominant surfaces 122_1, 122_2 remain parallel to the lamp axis during temperature changes. Furthermore, the angle of the lip may also be adjusted to adjust the field of view of the lamp out of the lower opening 150.

It is not necessary that the lip is provided to the lower edge of the shield 120. Instead, it may be provided to the upper edge, as illustrated in FIG. 6. This variant shows the lip 124_1, 124_2 extending outward from the upper edge of the dominant surfaces 122_1 and 122_2 of the shields. Other strengthening configurations may equally apply, for example a slightly protruding beam may be formed or applied to the surface of shield so that the beam extends along the shield in the direction of elongation; i.e. the 'lip' may not be formed along one of the edges of the shield but instead along one or both of the inner and outer surfaces of the shield.

Figure 6:
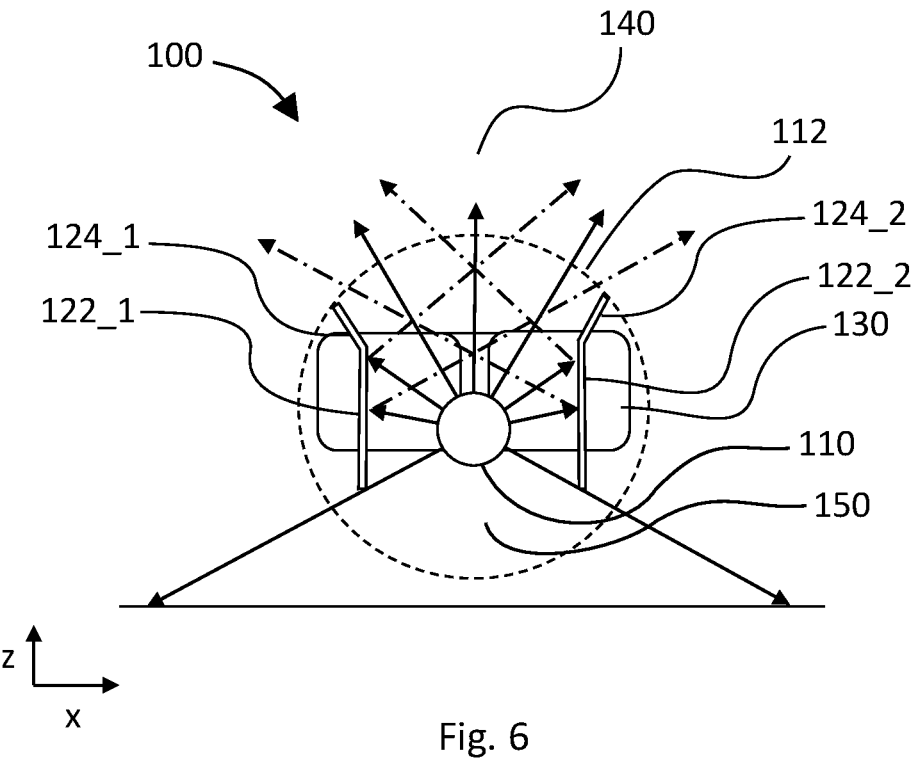
FIG. 6 is a schematic cross section view of a lamp assembly in which the shield comprises a lip along the upper edge.
Figure 7:
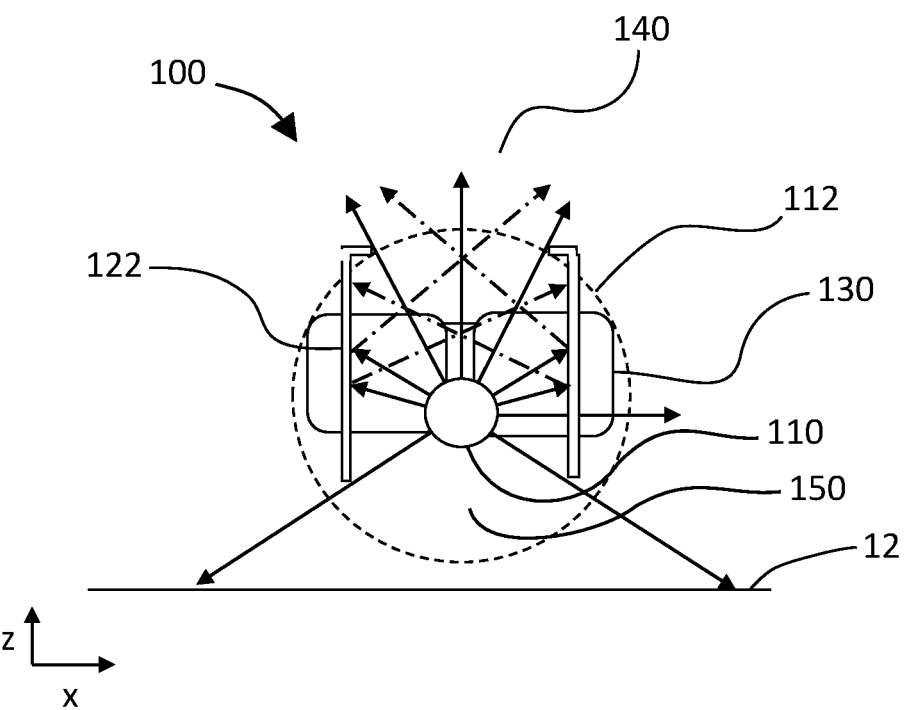
FIG. 7 is a schematic cross section view of a lamp assembly in which the upper opening is partially restricted.

In FIGS. 5 and 6, the lip 124 is shown as a planar surface. However, the strengthening lip may instead be a curved extension of the lower and/or upper edges of the sheets 122_1, 122_2, to achieve the same effect.

Accordingly, at least one of the shields comprises a lip 124 angled or curving away from an upper and/or lower edge of a dominant surface of the shield 120 and outwards of the upper opening 140/and or lower opening 150 respectively. The strengthening lip 124 may be provided to all or part of one or both of the elongate edges of the dominant surface.

It should be noted that the 'dominant surface' may take on a dual purpose of shielding and strengthening. For example, the dominant surface may comprise two elongate sheets, a vertical upper sheet and an angled lower sheet attached to the lower edge of the upper sheet and angled with its lower edge towards the lamp axis 114, both sheets combined representing 100% of the total shield surface.

In other implementations, a horizontal or inwards angled strengthening lip may be provided to the upper edge of the shield, so as to further restrict the radiation emerging from the upper opening 140 to a certain range of angles. This may be useful when the head height above the lamp assembly 100 is limited within the working space. An example of such an implementation is shown in FIG. 7. A strengthening lip 124_1, 124_2 is attached to the upper edge of respective sheet 122_1, 122_2 and extends laterally inwards over a fraction of the distance of the upper opening defined by the inward edges of the lips 124_1, 124_2.

Therefore, at least one of the shields 120 may comprise a lip 124 angled away from an upper edge of a dominant surface 122 of the shield and into the upper opening 140 above the lamp 110 so as to partially bound the space above the lamp; for example at least one of the shields may comprise a lip 124 in the form of an L- or T-section extending horizontally outwards from the upper edge of the dominant surface of the shield, one section of the lip 124_1, 124_2 extending into the opening above the lamp 110 so as to partially bound the space above the lamp 110. Preferably, the inward facing lip 124_1, 124_2 may be arranged to be located outside of the vaporisation front and has a non-reflective surface so as to prevent direct lamp radiation being reflected back onto the build bed 16.

In such implementations, in addition to limiting the angle of radiation emerging from the upper opening, the extent of the lip, similar to the outward angled lips, may be chosen to provide sufficient stiffness to the sheet, while at the same time limiting the surface area presented to the build bed surface that may irradiate the white powder with secondary radiation and partially solidify it.

Preferably, the shield 120 is located at least partially within the vaporisation front 112 of the lamp 110 so as to avoid accumulation of powder and ink mist on the shield. Preferably, the entire shield 120 is located within the vaporisation front 112. Preferably still further, the lip 124, especially where inward facing, is arranged to be located outside of the vaporisation front 112.

The inward facing lip may be provided in an alternative arrangement and having additional benefit. In some apparatus where frequent access is required that may cause damage to a bare lamp or injury to the user, or where a viewer window would receive a significant amount of the radiation that the assembly allows to radiate upward, it may be beneficial to provide a guard to the upper opening 140. For example, with reference to FIG. 8, the upper opening 140 may be provided with a series of crosswise upper opening struts 142 spaced apart from one another along the elongated upper edge of the shield 120 and extending across the upper opening 140, thus defining a group of upper sub openings 140_1, 140_2, . . . .

Figure 8:
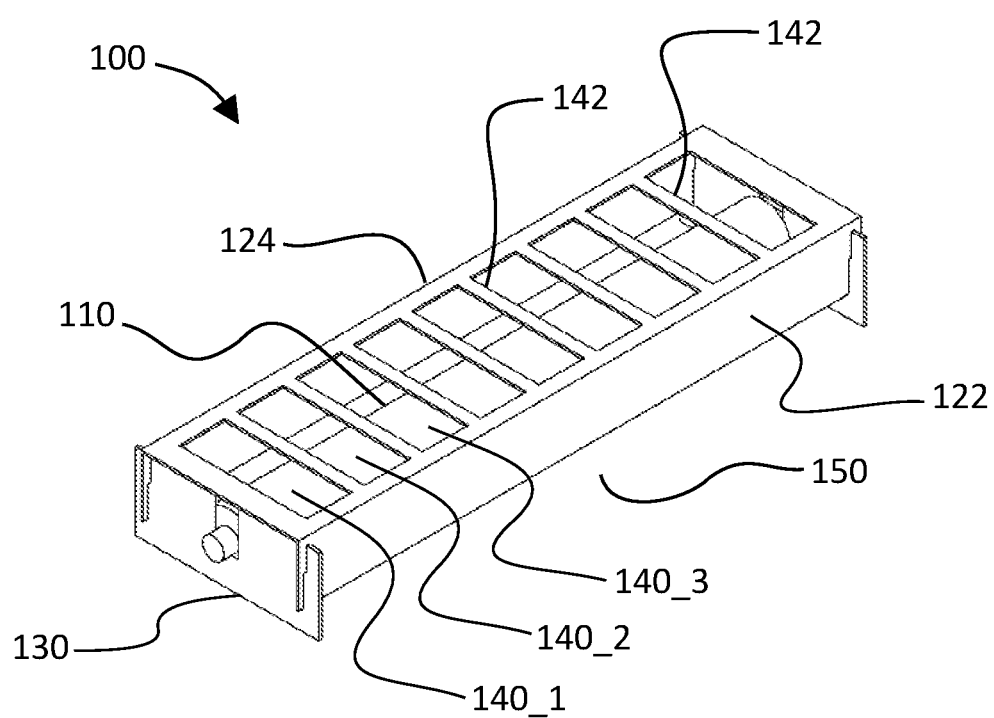
FIG. 8 is a schematic three-dimensional illustration of a lamp assembly in which the upper opening has a group of sub openings defined by crosswise struts.

In more detail, FIG. 8 is a three-dimensional illustration of a lamp assembly 100 having crosswise struts 142 between the upper edges of the shields 120_1 and 120_2, and defining upper sub openings 140_1, 140_2, . . . . These struts 142, preferably of the same material as the sheet 122 and lip 124 of the shield 120, such as thin metal sheet, are for protective purposes and designed so as to not significantly restrict radiation from passing through the upper opening. The surface area presented by the lip 124 and the struts 142 only insignificantly restricts the passage of radiation through the upper opening 140. Preferably, the struts are located outside of the vaporisation front and their downward facing surface coated in radiation absorbent material so as to prevent lamp radiation being reflected down towards the build bed surface 12.

Figure 9A:
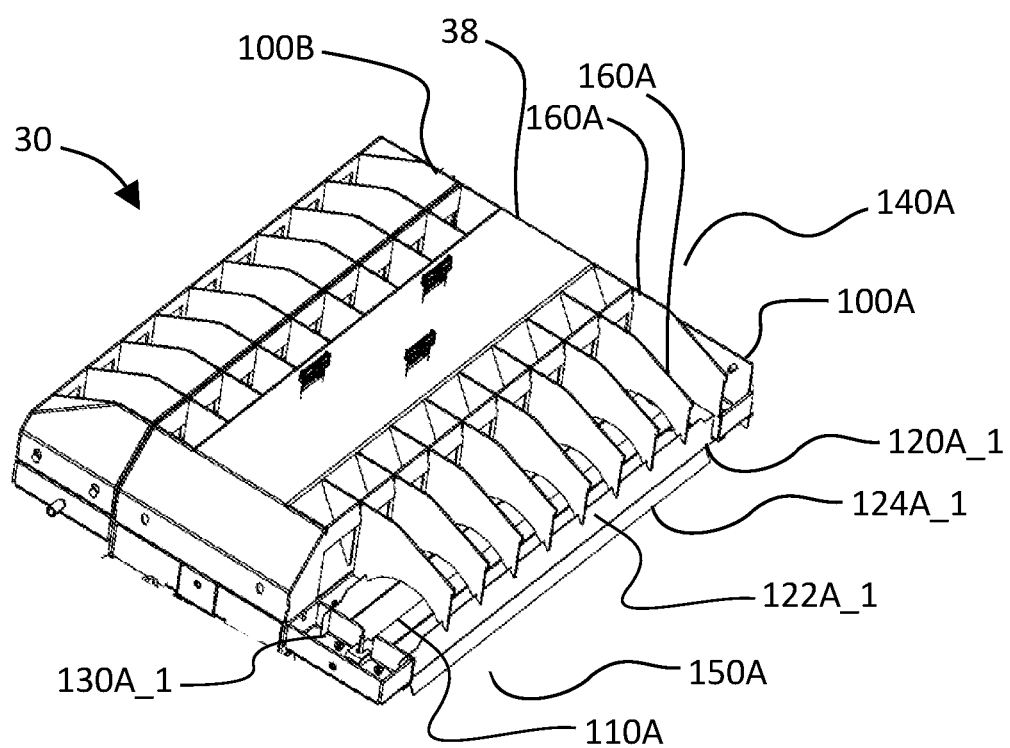
FIG. 9A is a schematic three-dimensional illustration of a carriage comprising two lamp assemblies in which the upper sub openings are defined by guards.

In some implementations of the lamp assembly 100, each of the struts 142 of the series of crosswise struts extends upward away from the upper opening to form a series of planar guards 160 extending away from the lamp 110 so as to allow radiation to pass through the upper sub openings. An example of such an implementation is illustrated in FIG. 9A by way of a three-dimensional representation of the lamp assembly 100 provided to a carriage 30. In this example, the carriage 30 comprises two identical lamp assemblies 100A, 100B at either side of a printing module 38. The assemblies 100 are similar to that of FIG. 8, where the struts 142 are formed by a series of guards 160 mounted parallel to one another down the direction of elongation of the upper edges of the shields 120A_1, 120A_2 as indicated for assembly 100A (similarly for assembly 100B). In the Figure, only the outer shield 120A_1 is visible.

The sub openings 140A_1, 140A_2 (not labelled but equivalent to those shown in FIG. 8) are thus defined by the spacing between the guards 160A. The guards 160A are in the form of planar protrusions extending away from the upper opening 140A along a radial direction, so as to protect a viewer from direct lamp radiation and to prevent a user from being able to access the lamp 110A, or to accidentally touch hot surfaces close to the lamp 110A. The guards 160A are preferably made of thin metal so as to present a negligible obstruction to the upper opening. In this way, the guards do not significantly restrict radiation from passing through the sub openings 140A_1, 140A_2, . . . of the upper opening 140A, and do not to present an obstruction to radiation leaving the upper opening 140A in a direction vertically upwards. The downward facing surface area of the guards (the lower edge defined by the thickness of the sheet of which the guards are made) are preferably arranged to be located outside of the vaporisation front. In addition, the downward facing surface may be coated in radiation absorbent material so as to prevent lamp radiation being reflected down towards the build bed surface 12.

The shields 120A, as shown for the outer shield 120A_1, are comprised of a dominant surface 122A_1 and strengthening lips 124A_1, 124A_2 (not visible) extending from the lower edges of the respective dominant surface 122A_1, 122A_2 and angled outwards with respect to the lamp 110A. The angle and extent of the lips 124A_1, 124A_2 may be chosen to provide stiffness to the dominant surface 122A_1, 122A_2 that is sufficient to ensure that the dominant surfaces 122A_1, 122A_2 remain parallel to the lamp axis during temperature changes. Furthermore, the angle of the lip may also be adjusted to adjust the field of view of the lamp 110A out of the lower opening 150A.

Figure 9B:
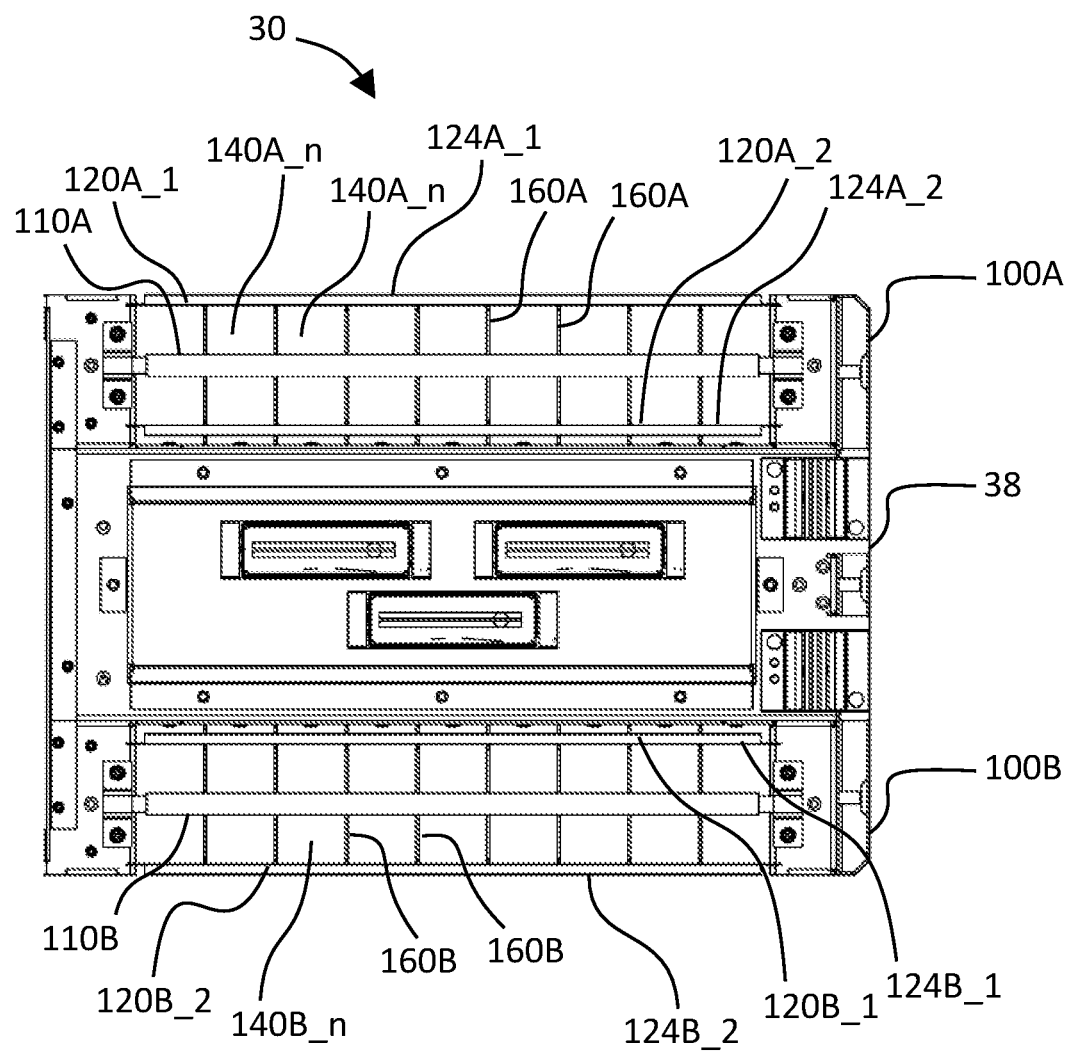
FIG. 9B is a plan view from below of the carriage of FIG. 9A.

The components of the carriage 30 are further illustrated in a plan view from below in FIG. 9B, showing the shields 120A_1, 120A_2 at either side of the lamp 110 in each assembly 100.

The shields 120A_1, 120A_2 are identical to one another and arranged as mirror images of one another to either side of the lamp 110A. While not essential, the lamp assembly 100B is identical to the lamp assembly 100A, and the shields 120B_1, 120B_2 are identical to one another and arranged as mirror images of one another to either side of the lamp 110B. Therefore, equivalent components of each assembly may be identified by replacing 'A' with 'B'.

Thus, the group of upper sub openings 140_1, 140_2, . . . may be provided by a series of planar guards 160 mounted to the upper edge of at least one of the shields 120 and across the upper opening 140, creating sub openings 140_1, 140_2 . . . , wherein the planar surface of the guards 160 extends away from the lamp 110 in a radial direction so as to allow radiation to pass unimpeded upwards through the upper sub openings 140_1, 140_2, . . . . The guards provide the dual function of strengthening/stiffening struts and viewer guards.

The extent of direct lamp radiation reaching a viewer window may be adapted by the spacing and/or upwards extent of the guards.

FIG. 9A also illustrates an example of how the lower edge of the guards 160 may be shaped so as to fall outside of the lamp vaporisation front 112—in this design the lower edges describe a segment of a circle outside of the vaporisation front and around the lamp axis 114. Additionally, the surfaces outside of the vaporisation front may be IR absorbent, e.g. black.

The struts 412 or guards 160 as described herein need not be directly attached to the shield(s). Instead, the struts and/or guards may be attached to the carriage with respect to the shield(s). In this way, the shield(s) may thus be detachable from the carriage, independently from the struts or guards.

The invention disclosed herein is not limited to any particular practical implementation in which the elongate lamp 110 and elongate shield(s) 120 are mounted. For example, the elongate lamp 110 and the one or more shields 120 may be mounted directly to the carriage 30, or to a frame of the carriage. The lamp may be mounted to a different part of the carriage or frame compared to the one or more shields. The specific arrangement between the lamp and the one or more shields may thus be achieved in different practical implementations. The various embodiments and implementations described for the lamp assembly 100 with respect to FIGS. 2A to 9B equally apply to the lamp 110 and shield(s) when individually and/or directly mounted to the carriage 30, where the functionality of the frame 130 may be readily implemented in alternative ways on the carriage by the skilled person.

Accordingly, an infrared lamp carriage 30 for an apparatus for the formation of three-dimensional objects by consolidation of particulate material is provided, the carriage comprising:

an elongate infrared lamp 110 extending along a lamp axis 114;

an elongate shield 120 extending parallel to and along one side of the lamp axis 114, wherein the shield 120 is such that it at least partially bounds the space to one side of the lamp; and a lower opening below the lamp and an upper opening above the lamp, such that radiation generated by the lamp 110 is able to radiate through the lower opening 140 and the upper opening 150 and away from the lamp in directions not bounded by the shield. The shield 120 may be mounted between the lamp 110 and a surface of the carriage 30.

The carriage may further comprise a second elongate shield extending alongside the lamp and opposite the first elongate shield so that the lamp is located between the shields.

At least one of the elongate shields 120 may comprise a dominant surface as described in relation to the lamp assembly 100 that is planar. Each shield may comprise a dominant surface and the dominant surfaces of the two shields 120_1, 120_2 may be non-parallel to one another. Alternatively, the dominant surfaces of the two shields 120_1, 120_2 may be parallel to one another. As a further alternative, each elongate shield may comprise a dominant planar surface and the dominant planar surfaces may be angled towards one another such that the lower edges of the dominant surfaces are closer to one another than the upper edges of the dominant surfaces, and such that the upper opening 140 is larger than the lower opening 150. The lamp axis 114 may be located at or above the plane defining the lower edges of the dominant surfaces of the elongate shields.

The lamp and at least one of the elongate shields 120 may be is mounted to the carriage such that the planar dominant surface of the elongate shield forms a tangent plane to the surface of a cylindrical constant power envelope centred about the lamp axis.

The planar dominant surface may extend by different amounts to either side of the contact line between the tangent plane and the constant power envelope.

In addition, or instead, at least one of the shields may comprise a lip angled away from an upper and/or lower edge of the or a dominant surface of the shield and outwards of the upper and/or lower opening respectively. The lip may be angled away from an upper edge of the dominant surface of the shield and into the opening above the lamp so as to partially bound the space above the lamp.

The upper opening may comprise a series of crosswise struts 142 extending from the upper edge of the at least one shield 120, or between the upper edges of the two shields 120_1, 120_2, across the upper opening 140 and defining a group of upper sub-openings.

Each of the struts 142 of the series of crosswise struts may extend upward away from the upper opening 140 to form a series of planar guards or protrusions 160 extending away from the lamp so as to allow radiation to pass through the upper sub-openings.

In addition to the above lamp 110 (which may be considered to be a "first" lamp 110A extending along a "first" lamp axis), the carriage 30 may further comprise a second elongate infrared lamp 110B, for example as illustrated in FIG. 9B, the second lamp 110B extending along a second lamp axis parallel to the first lamp axis; a second lamp elongate shield 120B_1 extending parallel to and along one side of the second lamp axis, wherein the second lamp elongate shield 120B_1 at least partially bounds the space to one side of the second lamp 110B; and a second lower opening below the second lamp 110B and a second upper opening above the second lamp 110B, such that radiation generated by the second lamp 110B is able to radiate through the second lower opening and the second upper opening 140B and away from the second lamp 110B in directions not bounded by the second lamp elongate shield. Such a carriage is exemplified in FIGS. 9A and 9B.

The second lamp elongate shield 120B_1 may be mounted between the second lamp 110B and a second surface of the carriage as shown in FIG. 9B, or it may be mounted between the second lamp 110B and a shield of another lamp. In the variant shown in FIGS. 9A and 9B, each lamp 110A, 110B is mounted between respective two elongate shields 120_1, 120_2, where one of the shields (in the FIG. 9B shields 120A_2 and 120B_1) is located between a respective lamp 110 and a surface of the carriage. Furthermore, the second shield of respective lamps (in the FIG. 9B shields 120A_1 and 120B_2) is located so as present part of an outward side of the carriage 30.

The first elongate lamp 110A may be mounted near or at one of the edges of the carriage 30 and the second lamp 110B may be mounted at another, opposing edge of the carriage. In the apparatus 1, these edges of the carriage may represent the leading or trailing edges of the carriage when it is in motion, and the second elongate lamp 110B may be mounted near or at the other of the leading or trailing edges of the carriage such that the second lamp elongate shield 120B_1 is mounted between the second lamp and a second surface of the carriage.

As before, each shield 120 may preferably be located at least partially within the lamp vaporisation front, and may be formed from a metal sheet of constant thickness of between 0.4 mm and 1 mm thickness.

Apparatus Comprising the Assembly, or the Carriage Comprising the Lamp and Shield(s)

The lamp assembly 100 and the carriage 30 comprising at least one elongate lamp 110 and respective elongate shield 120, and the various embodiments and implementations of the assembly or of the lamp in relation to the shield(s), dominant surfaces, lip, struts and protrusions as described with respect to FIGS. 2A to 9B, are of particular beneficial use in a sintering apparatus, or any apparatus requiring use of an infrared elongate tube lamp that would otherwise excessively heat up nearby components and thus compromise the reliability of the build process. In the following, reference to 'assembly 100' equally applies to the lamp 110 and shield(s) 120 being directly mounted to the carriage, irrespective of how the lamp and shield(s) are mounted to the carriage. Returning to FIG. 1, accordingly, an apparatus 1 for the formation of three-dimensional objects by consolidation of particulate material comprises a working space 4, the working space 4 comprising: a build bed surface 12 of particulate material arranged at a lower surface bounding the working space 4, and a ceiling 60 arranged at an upper surface bounding the working space 4; and a carriage 30 to which the lamp assembly 100 is mounted (or to which the lamp and shield(s) and other optional features according to the present disclosure are mounted) and for moving the lamp assembly 100 (or the lamp and shield(s) and other optional features) across the build bed surface 12, wherein the lower opening 150 is arranged to pass, in use, radiation towards the build bed surface 12 and the upper opening 140 is arranged to pass, in use, radiation away from the build bed surface 12 into the working space 4 and towards the ceiling 60. The shield 120 may be located between the lamp 110 and surfaces of the carriage 30 facing the lamp 110.

The lamp may be mounted near the trailing or leading edge of the carriage when in motion. Additionally, or instead, it may be mounted between different components provided on the carriage, for example between a printing module 38 and a distribution device 36.

The lower opening 150 and the lamp axis 114 are preferably arranged parallel to the build bed surface 12. The upper opening 140 faces the ceiling 60 of the apparatus that bounds the working space vertically, and thus the space above the carriages and the build bed surface 12. The working space 4 may be described as the space in which the build process is carried out, and providing the range of motion of the carriages.

As described above, during operation of the lamp 110 within the apparatus 1, the shield 120 may preferably be located within the vaporisation front 112 of the lamp 110, so that, during operation of the lamp, the shield reaches a pyrolysis temperature of 300° C. or more. For example, the pyrolysis temperature may be reached while the lamp 110 is operated as it passes over the build bed surface 12, and cools down to below pyrolysis temperature soon after the lamp 110 is switched off after passing the build bed surface 12. During a build process, the cycle of being above pyrolysis temperature may be a regular cycle, with a constant period between successive intervals during which the shield reaches a temperature above pyrolysis, and a constant duration above the pyrolysis temperature within the period.

To assist with cooling of the shield 120 and nearby surfaces of the carriage 30, the assembly (or lamp and one or two shields) may furthermore be mounted to the carriage 30 such that a gap exists between the (inner) shield and the nearest surface of the carriage facing the shield. For example, this may be the chassis of the carriage to which the support structure (e.g. frame) 130 may be attached, or it may be the chassis itself for example. By keeping a gap between the carriage 30 and the shield, a convection flow is allowed to persist through the gap from the hot build bed surface 12 towards the ceiling 60. Thus, the surface of the carriage 30 facing the lamp 110 may be located next to one of the shields so as to create a gap that allows a convection flow, so that, during operation of the lamp 110, the surface of the carriage 30 facing the lamp 110 remains below the melting point of the particulate material.

To remove the heat generated by the radiation that the ceiling 60 receives from the upper opening 140 of the lamp assembly 100, the ceiling 60 bounding the working space 4 may comprise a heat sink. The heat sink may be passive or active. For example, the ceiling may comprise a thermally conductive material and heat received from the upper opening 140 of the lamp assembly 100 may simply be dissipated sufficiently across and through the ceiling 60 to the outside of the apparatus 1. Otherwise, the ceiling 60 may furthermore comprise heat fins on its external surface (on the outside of the apparatus 1 and outside of the working space 4), and/or it may comprise liquid or gas cooled pipes that are thermally connected to the working space 4. Additionally, or instead, the inner ceiling surface bounding the working space may be coated in an IR absorbent material that is able to absorb the radiation from the upper opening of the assembly—for example the inner ceiling surface may be black. Furthermore, the inner ceiling surface may comprise fins or protrusions reaching into the working space so as to increase the radiation absorbent surface.

Any of the lamp assemblies 100 described above may be suitable for use in the apparatus 1. Lamp assemblies having an inner shield only for mounting between the lamp and the carriage may be useful in an apparatus in which the lamp assembly 100 is located at an extreme end of the carriage and is not bounded by any components on the outer side. An example of such an apparatus is shown in FIG. 1. In this apparatus, with only an 'inside' shield 120 fitted to the lamp assembly 100, the lamp radiation may dissipate in a lateral direction away from the carriage 30 as well as through the upper opening 140 and the lower opening 150. In the implementation of FIG. 1, the shield 120 comprises a dominant surface that is a planar surface elongate along and parallel to the lamp axis 114. The dominant surface extends vertically upward, perpendicular to the build bed surface 12, and perpendicular to its direction of elongation. Preferably, the apparatus 1 comprises an infrared lamp 110, and a shield 12 predominantly comprised of an elongate planar metal sheet that extends vertically upwards from the lower opening 150 to the upper opening 140. The planar metal sheet may be arranged within the lamp assembly 100 so as to extend vertically upwards from the build bed surface 12, to an extent so as to shield the carriage 30 from direct lamp radiation.

In some variants of the apparatus 1, it may further be necessary to protect components on the outer side of the lamp assembly 100, requiring an outer shield in addition to the inner shield. For example, the carriage itself may support components on either side of the lamp assembly 100 such as a printing module and a measuring device module such as a pyrometer. In other variants, a second carriage 30 may be provided downstream of the first carriage 30, so that the lamp assembly 100 mounted to the first carriage 30 is adjacent the second carriage 30 for at least some durations of the build process. As the first carriage 30 moves the lamp 110 across the build bed surface 12 to consolidate the present layer of particulate material, the second carriage 30 may closely follow behind to spread a fresh layer onto the layer the lamp 110 has just consolidated. The second carriage 30 may therefore need protecting by the second shield from the direct irradiation of the lamp 110. In other implementations of the apparatus, a significant proportion of the lamp radiation may reach the viewer window so that a second shield acts as viewer protection. In some apparatus therefore, the lamp assembly 100 may comprise a second elongate shield 120_2 extending along the side of and parallel to the lamp axis and located opposite the first shield 120_1. Optionally the first and the second shield 120_1, 120_2 comprise respective dominant surfaces 122_1, 122_2 that are planar and, optionally, are made of metal.

Additionally, or instead, the planar dominant surfaces 122_1, 122_2 of the two elongate shields 120_1, 120_2 may be arranged within the lamp assembly 100 so as to extend vertically upwards from the build bed surface 12 from the lower opening 150 to the upper opening 140.

Alternatively, at least one of the dominant surfaces 122_1, 122_2 may be curved to present a concave surface to the lamp axis 114 and arranged so as to provide an upper opening 140 that is larger in area than the lower opening 150. The cross section of the curvature, viewed along the lamp axis 114, may be circular or elliptical, or another curved shape that directs direct lamp radiation upwards and out of the upper opening 140. The specific shape and orientation of the one or more shields 120 may be determined by the arrangement of components within and the dimensions of the working space 4.

Each of the shields may comprise two or more dominant surfaces of distinct shape or configuration, for example two elongate surfaces adjoint along one of their elongate edges and arranged at an angle towards one another, and where both surfaces in combination have the function to dissipate radiation through the upper opening 140 of the lamp assembly 100 and into the working space 4.

Optionally, at least one of the shields 120 further comprises two or more elongate sub-surfaces forming the dominant surface, wherein the lower or upper elongate edge of the first surface is arranged at an angle to the second surface, such that the dominant surface flares outwards with respect to the lamp 110 and such that the lower opening 150 is larger than the upper opening 140. Such a configuration may provide a dominant surface that has a dual purpose of allowing radiation to pass through the upper and lower openings while being self-stiffening and making the shield robust against warping during cycles of extreme temperatures, and so as to ensure that the elongate surfaces of the shield remain substantially parallel to the lamp axis 114.

In some apparatus, the shield may predominantly comprise an elongate planar surface having a lower edge facing the build bed surface 12 and that is angled inwards of the lamp 110 such that its lower edge defines a lower opening 150 that is smaller than the upper opening 140. The elongate planar surface may be comprised of metal.

Where the apparatus comprises a second elongate shield 120_2 extending along the side of the lamp opposite the first shield 120_1, the second shield 120_2 may also comprise a dominant surface 122_2 having a lower edge facing the build bed surface 12 and that is angled with its lower edge inwards of the assembly, such that the two lower edges of the two shields 120_1, 120_2 define a lower opening 150 that is smaller in area than the upper opening 140.

The infrared lamp 110 may comprise a tube having a reflective coating along part of the inner tube surface, for example covering half of the inner tube surface. When mounted in the apparatus 1, the reflective coating is on the top portion of the tube to reflect and focus lamp radiation emitted from the upper half of the lamp 110 to the build bed surface 12. The lamp 110 is mounted in conventional apparatus such that the concave reflector faces the build bed surface 12 and focusses the lamp radiation along a perpendicular to the build bed surface 12, vertically below the lamp 110. In an apparatus having a lamp assembly 100, the inner shield 120_1 is bound to one side by the carriage 30 while the outer shield 120_2 may not be bound by any fixed components, and thus the inner shield 120_1 gets hotter than the outer shield.

As described above, the lamp assembly 100 may equally be useful for the purpose of consolidation as well as, or instead of, for the purpose of preheating the powder layer.

Figure 10:
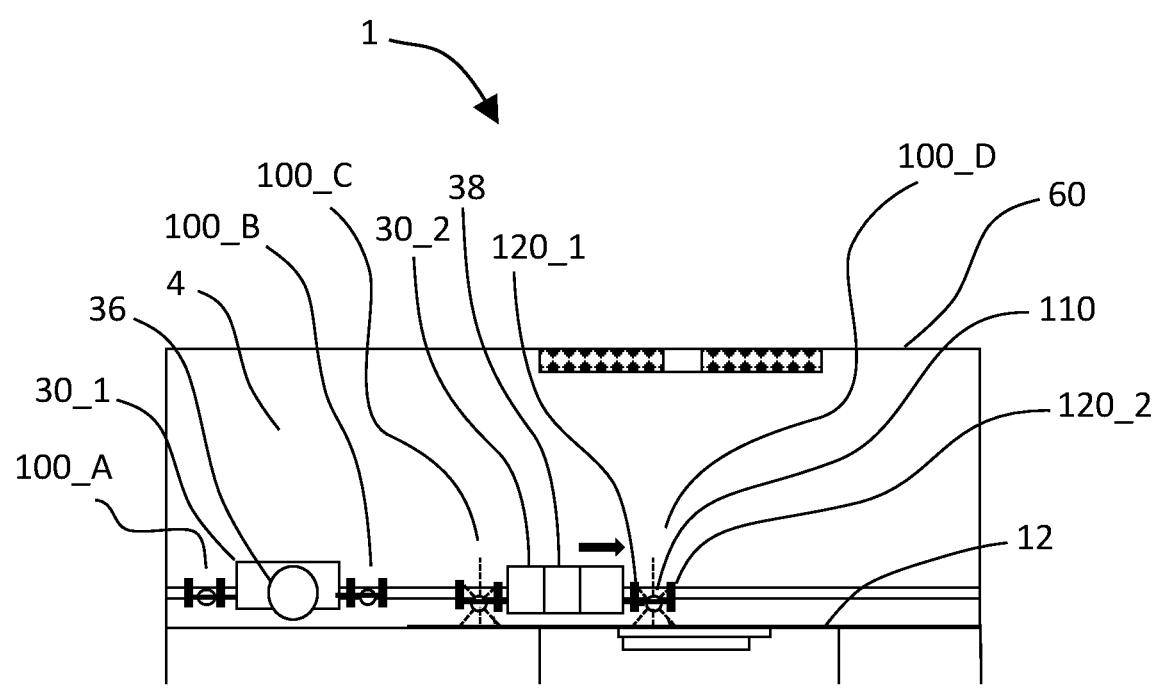
FIG. 10 is a schematic cross-sectional diagram of an apparatus for the layer-by-layer formation of three-dimensional objects provided with several lamp assemblies.

With reference to FIG. 10, a schematic cross section through an apparatus 1 along the direction of travel of the carriages shows various lamp assemblies 100, two each mounted to each carriage 30_1 and 30_2.

The distribution module 36 is provided on a first carriage 30_1 between two lamp assemblies 100_A and 100_B, and the printing module 38 is provided on a second carriage 30_2 between lamp assemblies 100_C and 100_D.

During motion of the carriages, for example with respect to the motion of the second carriage in the direction across the build bed surface 12 indicated by the arrow, the lamp assembly 100_D is located downstream, and the lamp assembly 100_C is located upstream of the printing module 38. The lamp assembly 100_D may act as a preheat lamp assembly ahead of the printing module 38 and the lamp assembly 100_C may act as a sintering lamp assembly following the printing module. This means that, for example, before the printing module is operated across a fresh layer of powder to deposit RAM, the preheat lamp assembly 100_D, operating lamp 110 at a relatively lower power compared to the power required for sintering, is passed over the build bed surface 12 to preheat the powder to a temperature close to the sintering temperature. The lamp 110 of lamp assembly 100_C, functioning as a sintering lamp and operating at higher power than the preheat lamp, may thus not have to impart as much power to achieve consolidation of the printed powder as it would if the layer had not been preheated.

Next, the first carriage 30_1 follows the second carriage 30_2. The lamp assembly 100_A and 100_B may both be operated as preheating lamp assemblies. Lamp assembly 100_B preheats the layer just processed by the second carriage, followed by the distribution module 36 spreading a fresh layer over the thus preheated processed layer. This may improve the adhesion between the sintered and fresh layer. The lamp assembly 100_A may be operated as a preheat lamp assembly that preheats the freshly distributed layer downstream of the distribution module 36.

Alternatively, lamp assembly 100_B may be operated as a sintering lamp assembly to provide a second sintering stroke following the first sintering stroke provided by lamp assembly 100_C.

Therefore, more than a single lamp assembly 100 may be mounted to more than one carriage within the apparatus 1, and/or more than one lamp assembly 100 may be mounted to the same carriage to provide a sintering and/or preheat lamp 110. Both lamp assemblies have at least an inner shield 120_1 located between the lamp and the carriage the lamp assembly is mounted to, and optionally, as shown for the assemblies of the apparatus illustrated in FIG. 10, also outer shields mounted on the outboard side of the carriage.

General Considerations

The shield 120 may comprise more than one sub-surface of specific orientation and/or shape, and that together make up the dominant surface 122 of the shield. One sub-surface contributing to the dominant surface may be angled or shaped differently to the other sub-surfaces contributing to the dominant surface. For example, the sub-surface near the lower opening 150 may be curved in cross section while a sub-surface near the upper opening 140 is a planar sub-surface.

In some implementations having two shields at either side of the lamp axis, the shields may have different shapes or vertical extents from one another so as to direct the lamp radiation into the working space as required by the design of the apparatus. For example, the inner shield between lamp and carriage may be taller, in the vertical direction away from the build bed surface 12, than the outer shield, and/or the inner shield may have a planar dominant surface extending vertically and the outer shield a planar dominant surface angled away from the vertical, where the vertical direction is, in use, a direction substantially vertical to the build bed surface 12, such that the upper and lower edges of the two shields (upper and lower with respect to the build bed surface in use, the lower edge being closer to the build bed surface than the upper edge) define an upper opening 140 that is larger than the lower opening 150. Other combinations may be envisaged.

The shields 120 of the assembly 110, once mounted to the carriage in the apparatus 1, may extend vertically, i.e. have a height along a direction perpendicular to the build bed surface 12, over a distance that is greater than the diameter of the lamp 110. Additionally, the lamp, when viewed along a projection direction along the plane parallel to the build bed surface 12, overlaps at least partially with one of the surfaces of the shield. Furthermore, the height of the shields may have a sufficiently vertical component so that any of the lamp radiation that would directly irradiate the carriage 30 or its components, or that would emerge from the lamp over at least its diameter in the horizontal direction, is blocked by the surface of the shield.

Material and Thickness, Temperatures

The shields according to the various implementations disclosed are preferably made of thin sheet, preferably thin metal sheet, of a thickness between 1 mm and 0.4 mm. This ensures that, in one respect, the shield does not present a substantial surface area facing the powder bed and emitting secondary radiation that may be absorbed by the unprinted powder. In another respect, heat is not stored by the shield since its thermal mass is small. This means the metal sheet cools down rapidly as soon as the lamp 110 is turned off. Preferably, the shields have a reflective surface. The shield may remain reflective and clean by mounting it within the vaporisation front.

The thin metal sheet from which the shields may be made may be aluminium or stainless steel, for example, as these materials are both good IR reflectors.

In some implementations of the lamp assemblies, the shield or shields may be mounted to the support structure (e.g. frame) with minimal contact area so as to limit thermal conduction between the shield and the support structure (and thus between the support structure and the carriage, once mounted).

The shield may be made at least partially of thermally non-conductive ceramic. Alternatively, the surface of the shield not facing the lamp may be coated with a thermally insulating layer; or the outer surface not facing the lamp may be a non-conductive ceramic having an inner surface coated in a thin metal layer. This may further protect the carriage 30 from the extreme temperatures the shield may reach, for example where a gap ensuring sufficient convection flow may not be maintained to sufficiently cool the sheet over certain durations of the build process.

During operation of the apparatus, the shield intercepts some of the direct lamp radiation so as to prevent adjacent parts of the carriage from heating up excessively. The sintering temperature of a nylon powder such as PA11 is around 180° C. or higher depending on the grade of polymer. Therefore the carriage is preferably kept at a temperature lower than the sintering temperature, for example lower than 160° C. for PA11, and preferably lower than 140° C. or even 120° C. As the sintering temperature is powder material dependent, the carriage should not reach temperatures close to the melting point of the powder, Tm, which could be as low as 100° C. for thermoplastic polyurethane.

In addition, the lamp assembly 100 is mounted to the carriage 30 such that the shield shields the nearmost parts of the carriage 30 from direct lamp radiation and so that the nearmost parts of the carriage 30 may be inside of the lamp vaporisation front whilst being shielded from excessive temperatures. In addition, a sufficient gap between the shield and the carriage may be provided to ensure convective cooling, so that the temperature of the carriage as well as of the shield may further be controlled.

The location of the shield within the vaporisation front 112 provides a reflective surface of the shield throughout operation of the apparatus. Whilst this prevents accumulation of molten material on the shield, a reflective surface further is able to redirect some of the lamp radiation reflected back from the powder surface away from the shield and into the working space 4 above.

For the shield to intercept sufficient radiation and prevent it reaching the carriage, the shield of the assembly 100, once mounted to the carriage 30 in the apparatus 1, may extend vertically, i.e. have a height along a direction perpendicular to the build bed surface 12, that is greater than the diameter of the lamp, and arranged with respect to the lamp 110 such that the lamp radiation that would otherwise directly irradiate the carriage 30 or its components is blocked by the surface of the shield. Optionally, the area covered by the lamp 110 when projected along a direction parallel to the build bed surface 12 onto the surface of the shield, at least partially overlaps with a surface of the shield.

In some implementations of the apparatus 1 when having a plurality of infrared lamps supported on one or more carriages, it may be desirable to provide an alternative lamp assembly in addition to the assembly described above. Such an alternative, second, assembly may comprise a radiation deflector that provides for deflection of radiation energy so as to upwardly release lamp radiation not used for sintering or preheating, and such that the extent and/or the direction of the upward radiated energy may be controlled. As before, the radiation deflector has an upper opening through which radiation unused for sintering may dissipate freely, which reduces or minimises the amount of heat transferred to the radiation deflector, thus preserving or enhancing selectivity. The unused radiation is redirected into the working space above the work surface and away from the build bed surface 12, and may more easily be managed via the comparatively large ceiling area of the apparatus.

An example of the infrared radiation deflector of a second assembly 200 is shown in a schematic cross-section perpendicular to the lamp axis 114 (i.e. along the y direction) in FIGS. 11A to 12B. Starting with FIG. 11A, the assembly comprises an elongate lamp 110 similar or identical to the elongate lamp described above, the lamp extending along a lamp axis 114. The deflector comprises a first mirror 230_1 and a second mirror 230_2 that describe sections of a linear parabolic trough with the lamp axis 114 located at the focal line f of the trough. The sections of the first mirror 230_1 and the second mirror 230_2 are opposing sections to either side of the vertex line V of the parabolic trough. An elongate lower opening 250 is provided near the vertex line V of the trough such that the lower opening 250 extends in the direction of the vertex line V.

Figure 11A:
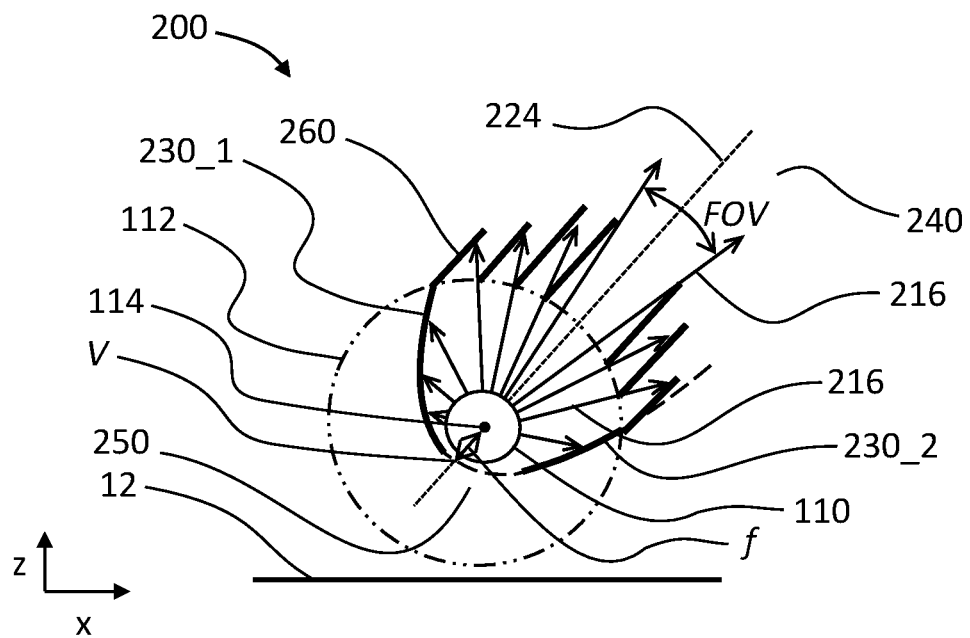
FIGS. 11A and 11B show a schematic cross-section of an infrared radiation deflector along the x-z plane according to a variant.

Thus, the first mirror 230_1 may represent a section along and to one side of the vertex line of a linear parabolic trough, so that the cross section of the first mirror as viewed down the lamp axis 114 (along they direction) is part of a parabola for redirecting at least a portion of "direct" lamp radiation 216 in the form of parallel (redirected) radiation through the upper opening 240. The first mirror 230_1 as shown in FIG. 11A has a cross-section extending linearly along, and to one side of, the vertex line V of the parabolic trough. For example, the section may extend to the lower opening and its lower edge may extend linearly and be aligned with, or define, the edge of the lower opening. The upper edge of the first mirror 230_1 may extend parallel to the lower edge of the first mirror.

Figure 11B:
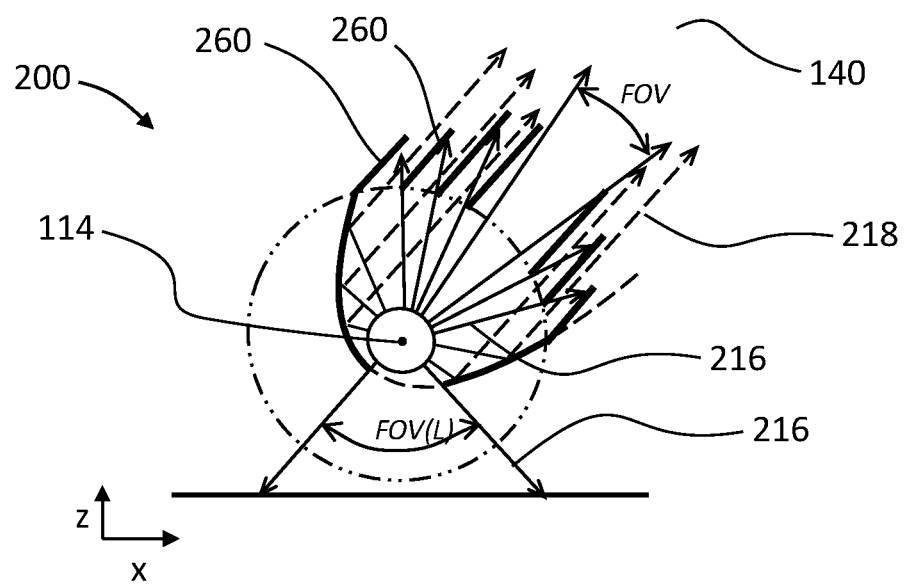

More particularly, FIG. 11A shows the direct lamp radiation 216 that may be expected to emerge from the lamp 110, and FIG. 11B, while omitting some of the labels of FIG. 11A for simplicity but which equally apply, shows the direct lamp radiation 216 and the redirected lamp radiation 218. The second mirror 230_2 is similarly shaped as the first mirror 230_1, and is arranged, almost in mirror image with respect to the plane of symmetry 224 of the trough, opposite the first mirror. The plane of symmetry 224 comprises the vertex line V. The radiation deflector represents thus a portion of a linear parabolic trough mirror, where the inner surfaces to either side of the vertex line V are arranged to redirect direct lamp radiation 216 in the form of parallel radiation 218 out of the upper opening 240 as shown in FIG. 11B.

In addition, although not essential, radiation absorbing surfaces 260 may be provided to the radiation deflector to block some of the direct radiation 216 so as to control the extent of the FOV as defined by the two innermost absorbing surfaces. The absorbing surfaces are non-reflective surfaces. They may for example have a black radiation absorbent finish at least over surfaces that are exposed to receive infrared radiation from the lamp (whether direct or reflected/redirected).

In the example shown, the radiation deflector 100 is tilted with respect to the build bed surface 12 such that the plane of symmetry of the parabolic trough is not perpendicular to the build bed surface. The lower opening 250 is offset from the vertex line such that the plane described by the lower opening 250 is angled with respect to the build bed surface 12. While this is optional, it may be beneficial in cases where the lower opening is to create a uniform field of view FOV(L) that is symmetric about the perpendicular to the build bed surface 12.

When viewed in cross section down the lamp axis location (along the y direction), the upper opening 240 may be arranged symmetrically with respect to the plane of symmetry of the linear parabolic trough of which the first and second mirrors represent sections.

The deflector assembly 200 may be provided to the carriage 30 in combination with providing the lamp 110 and elongate shield(s) 120 described herein. For example, in addition to at least one set of a lamp 110 and one or two elongate shields 120, the carriage may further comprise a deflector lamp assembly 200 mounted to the carriage, the deflector lamp assembly comprising a radiation deflector and a deflector elongate infrared lamp 110 extending along a deflector lamp axis, the radiation deflector comprising:
  opposing first and second elongate side walls; and
  an upper deflector opening 240 and a lower deflector opening 250 arranged to pass deflector lamp radiation to an exterior of the radiation deflector;
  wherein the first and second elongate side walls comprise a first elongate mirror 230_1 and a second elongate mirror 230_2 extending parallel to the deflector lamp axis and along at least a lower internal portion of the respective first and second side walls;
  wherein the deflector lamp axis extends along and between the first mirror 230_1 and the second mirror 230_2, the first and second mirror each having a concave surface with respect to the deflector lamp axis; and
  wherein the first mirror 230_1 is an upward deflecting mirror and further arranged to be concave with respect to the upper deflector opening 240 for redirecting at least a portion of direct deflector lamp radiation through the upper deflector opening 240; and
  wherein the radiation deflector is mounted to the carriage 30 so that, in use, the lower deflector opening 250 passes radiation towards the build bed surface 12 and the upper deflector opening 240 passes radiation into the working space 4 and, optionally, towards the ceiling 60.

The deflector assembly 200 may be mounted alongside the first lamp 110 such that the first lamp extends parallel to the deflector infrared lamp 110, in other words the two lamps extend side by side. The deflector lamp assembly 200 may be mounted directly adjacent a set of the lamp 110 and one or two shields 120. Additionally, or instead, the deflector assembly may be mounted to the opposite edge of the carriage, so that for example a printing module 38 is located between the deflector assembly 200 and the set of the lamp 110 and one or two shields 120.

The deflector may comprise one or more radiation absorbing surfaces 260 arranged to block direct radiation from exiting the upper deflector opening 240 at angles greater than a predetermined upper deflector opening field of view FOV, wherein the radiation absorbing surfaces 260 are elongate parallel planes extending in a direction parallel to the upper edges of the mirrors and wherein each radiation absorbing surface 260 has a depth direction chosen so as to block direct radiation from exiting the radiation deflector at angles greater than the predetermined upper deflector opening field of view FOV while allowing radiation to pass at angles equal to or smaller than the predetermined upper deflector opening field of view. Optionally, the first mirror 230_1 of the deflector may represent a section along and to one side of the vertex line V of a linear parabolic trough so that the cross section of the first mirror 230_1 as viewed down the deflector lamp axis is part of a parabola for redirecting at least a portion of the deflector lamp radiation in the form of parallel radiation through the upper deflector opening 240 of the deflector.

End supports not shown may connect the ends of the side walls (the mirrors 230_1, 230_2 in this case) of the deflector. The end supports may be in the form of a plate or of supporting struts, or one or more brackets. Alternatively, the deflector may be mounted directly to a frame on the carriage, by its ends or otherwise, and the lamp 110 may either be mounted to the deflector or it may be separately mounted to the frame of the carriage or similar structure.

The carriage 30 as described, comprising one or more sets of an elongate lamp 110 and one or two shields 120, and optionally the deflector lamp assembly 200, may be provided to the above-described apparatus 1.

It may be preferable to align the absorbing surfaces 260 such that they are parallel to one another and further parallel to the direction of the redirected radiation 218, i.e. parallel to the plane of symmetry of the linear parabolic trough of which the two mirrors 230_1, 230_2 represent sections. Depending on the placement, spacing, and/or extent of the absorbing surfaces 260 any non-parallel direct lamp radiation 216 may be substantially blocked from passing through the upper opening 240, while any redirected and predominantly parallel radiation 218 is allowed to pass in-between the absorbing surfaces. The absorbing surfaces 260 may preferably be located outside of the lamp vaporisation front 112 so as to ensure they remain absorbent.

Thus using the lamp deflector assembly 200, the directionality of the radiation may be controlled and the angular spread that defines the field of view FOV may be equal to or at least close to zero. This may for example be useful where certain locations or features at or near the ceiling 60 of the working space 4 are to be protected from receiving radiation from the upper opening, for example the strong radiation emitted from the lamp 110 when in sintering mode.

Figure 12A:
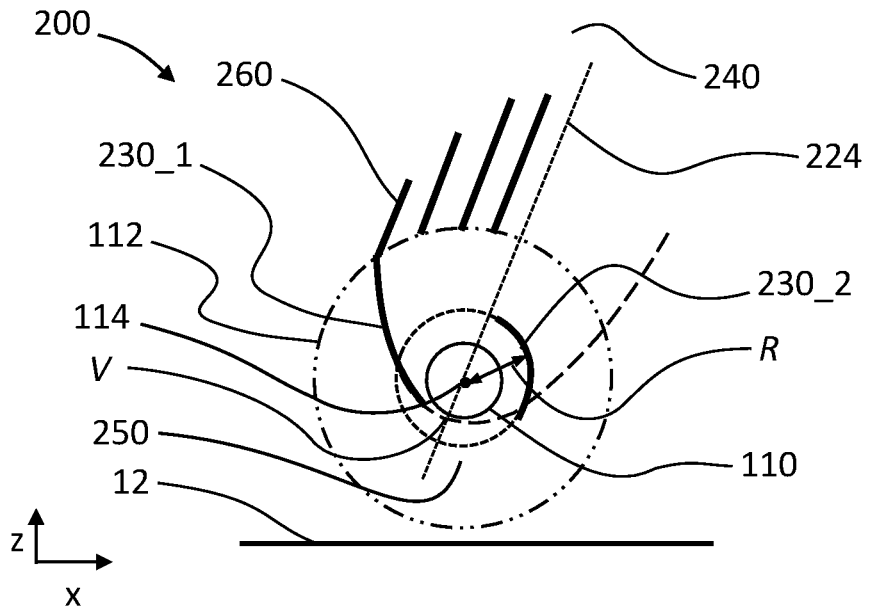
FIGS. 12A and 12B show a schematic cross-section of an infrared radiation deflector along the x-z plane according to a variant of FIGS. 11A and 11B.

Instead of both mirrors representing a section each of a linear parabolic trough, only the first mirror 230_1 may form a section of a linear parabolic trough. The second mirror 230_2 may have a linear concave curvature about the lamp axis 114, i.e. extending linearly along and parallel to the lamp axis and curving about the lamp axis. FIG. 12A is a schematic cross section of a variant of the radiation deflector, shown perpendicular to the lamp axis 114 (i.e. along they direction) of the lamp 110. The focal line of the parabolic mirror 230_1 is coincident with the lamp axis 114. The second mirror 230_2 may be a section of a linear cylindrical mirror with its focal line coincident with the lamp axis 114. This means that any direct radiation 216 from the lamp is reflected back by the cylindrical mirror 230_2 onto the lamp axis 114. As FIG. 12B illustrates, any direct lamp radiation 216 reaching the first (linear parabolic trough) mirror 230_1 is redirected as parallel infrared radiation out of the upper opening 240.

In this variant, the second mirror 230_2 further acts as a radiation restrictor similar to the absorbing surfaces, although this is achieved by reflection rather than absorption. The upper edge of the second mirror delimits the angular spread of the FOV to one side of the upper opening 240. In addition, some of the reflected radiation may pass from the second mirror to the first mirror, either to be redirected to pass out of the upper opening 240, or to be absorbed by the absorbing surfaces 260.

The angular spread of the FOV to the other side of the upper opening 240 may be delimited by radiation absorbent surfaces 260 arranged parallel to the direction of the redirected radiation, i.e. parallel to the plane of symmetry of the linear parabolic trough of which the first mirror 230_1 represents a section. The previous description of the radiation absorbent surfaces 260 may equally apply. The vaporisation front 112 may extend to the upper edge of the first mirror 230_1 and encompasses the second mirror 230_2.

Figure 12B:
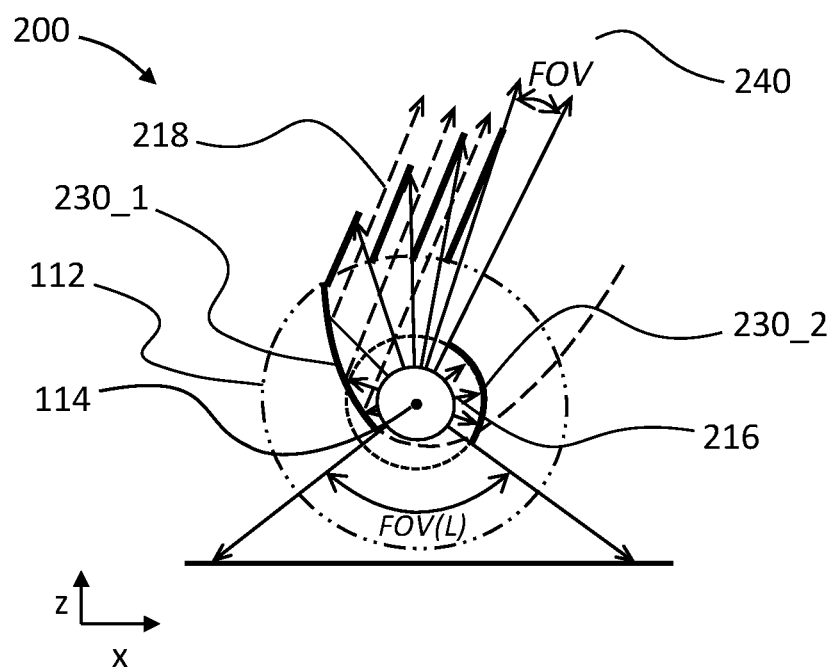

With the variant of FIG. 12B, it is possible to block all or substantially all non-parallel radiation by extending the upper edge of the second mirror 230_2 to or beyond the plane of symmetry 224. It will be appreciated that where radiation absorbing surfaces are provided, the upper opening 240 is defined by the combined opening presented by the sub openings defined between the radiation absorbent surfaces 260.

The mirrors 230_1, 230_2 of the deflector may be formed from thin metal sheet 0.4 to 1 mm thick. This ensures the mirrors have a low thermal mass and do not store heat, while a high thermal conductivity (for example by being made of metal) ensures ready heat dissipation. For example, the radiation deflector may temporarily pass through cooler air flows within the working space 4 and is able to cool down quickly, or it may lose heat readily as soon as the lamp is switched off.

In the apparatus, as will be appreciated from the foregoing description, the direction of radiation emerging from the first 'open' assembly 100 via the upper opening 140 may not be well controlled and may interfere with sensitive measurement equipment, for example an infrared camera monitoring the build bed surface.

Figure 13:
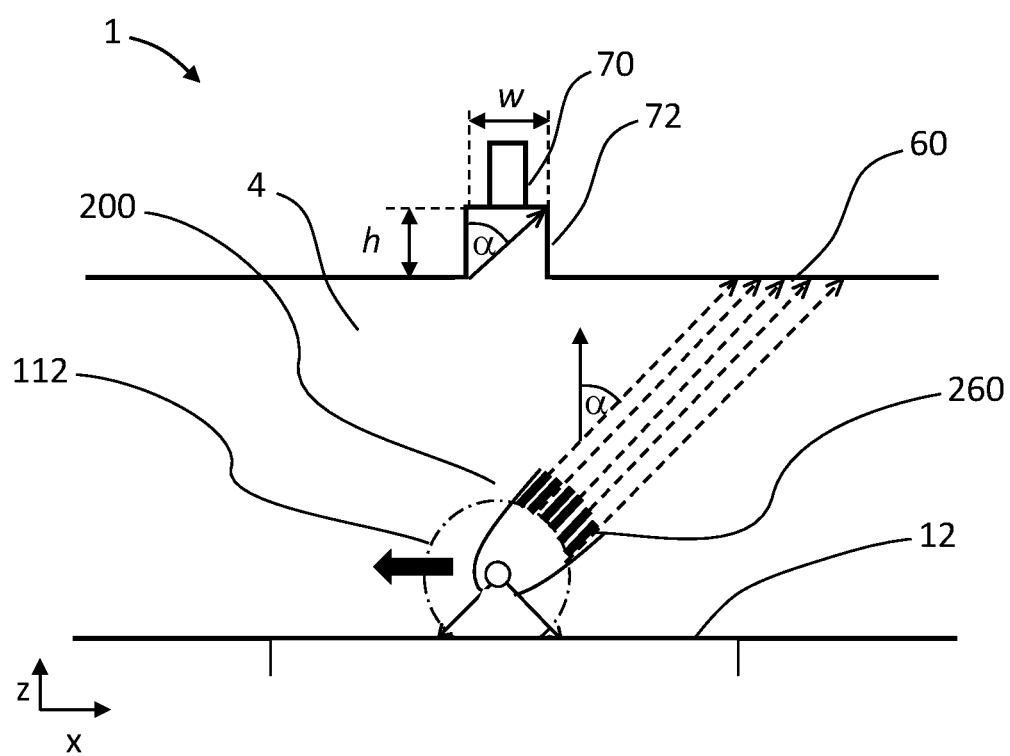
FIG. 13 is a schematic cross-sectional diagram of an apparatus for the layer-by-layer formation of three-dimensional objects according to a variant.

FIG. 13 illustrates how variants of the deflector lamp assembly comprising a radiation deflector and a lamp 110 (which is referred to herein as a 'deflector lamp' to distinguish from the lamp 110 used in combination with one or two shields, even though these two lamps may be identical), when used for example for sintering, may be beneficial in protecting sensitive components comprised at or within the ceiling of the apparatus 1 that are affected by the strong radiation of a sinter lamp. FIG. 13 is a side view of an apparatus 1 in which a deflector assembly is provided comprising a linear parabolic reflector comprising two opposing mirrors 230_1, 230_2 that are positioned as mirror images of each other, similar to or the same as the deflector illustrated in FIG. 11A. While for simplicity a carriage 30 is not shown, nor the assembly of the first type, the deflector lamp assembly 200 may be mounted to a carriage 30 travelling in the direction of the arrow. The deflector lamp assembly 200 shown is mounted such that the plane of symmetry of the linear parabolic trough, of which the first and second mirrors 230_1, 230_2 form side wall sections, is tilted by an angle α with respect to the perpendicular to the build bed surface 12 (along the z direction).

The upper opening 240 (not labelled but similar to the same to the one indicated in FIG. 11A) is arranged to emit substantially parallel radiation at an angle α with respect to the perpendicular to the build bed surface 12 by use of radiation absorbing surfaces 260 arranged as previously described in relation to FIGS. 11A and 11B.

A radiation sensitive component 70 is mounted to the roof of a recess 72 in the ceiling 60. The radiation sensitive component 70 may be a sensor that requires protection from the lamp radiation emitted from the upper opening 240. To protect the component 70, the recess 72 in the ceiling may be designed to have a width w and height h that ensures that, as the lamp assembly 200 is moved across the build bed surface 12, the parallel radiation emerging at an angle α to the vertical (z direction) from the build bed surface 12 does not reach the top surface of the recess 72 and thus does not irradiate the component 70. This is achieved by setting the width w, height h and angle α such that the angle α is larger than $\tan^{-1}$ (w/h).

In the apparatus 1, the deflector lamp assembly 200 may be mounted to the same carriage 30 to which the first assembly 100 is mounted.

The deflector assembly 200 may be mounted alongside the first assembly 100 such that the infrared lamp 110 of the first assembly 100 extends parallel to the deflector infrared lamp 110 of the deflector assembly 200.

Alternatively, the deflector lamp assembly 200 may be mounted to a second carriage 30_2 independently moveable from the (first) carriage 30_1 to which the first assembly 100 is mounted.

The deflector may further comprise one or more radiation absorbing surfaces 260 arranged to block direct radiation from exiting the deflector upper opening 240 at angles greater than a predetermined upper opening field of view, wherein the radiation absorbing surfaces 260 are elongate parallel planes extending in a direction parallel to the upper edges of the mirrors 230 and wherein each radiation absorbing surface 260 has a depth direction chosen so as to block direct radiation from exiting the radiation deflector at angles greater than the predetermined upper opening field of view FOV while allowing radiation to pass at angles equal to or smaller than the predetermined upper opening field of view FOV.

The first mirror 230_1 of the deflector may represent a section along and to one side of the vertex line V of a linear parabolic trough so that the cross section of the first mirror 230_1 as viewed down the lamp axis 114 is part of a parabola for redirecting at least a portion of lamp radiation in the form of parallel radiation through the upper opening 240 of the deflector.

The deflector may be arranged such that the direction of the parallel radiation emerging from the upper opening 240 forms an acute angle α to the perpendicular to the ceiling 60. Where the radiation emerging from the deflector upper opening 240 is parallel radiation, the angle of the perpendicular to the ceiling to the 'FOV' of the parallel radiation is the angle α as shown.

To remove the heat generated by the radiation that the ceiling 60 receives from the upper opening 140 from the lamp(s) 110 mounted to the first assembly and/or second assembly, the ceiling 60 bounding the working space 4 may comprise a heat sink. The heat sink may be passive or active. For example, the ceiling may comprise a thermally conductive material so that heat received from the upper opening 140 of the lamp assembly 100 or 200 may simply be dissipated sufficiently across and through the ceiling 60 to the outside of the apparatus 1. The ceiling may alternatively, or in addition, be cooled by a coolant flowing through coolant pipes in contact with the ceiling. In order for the ceiling to efficiently absorb radiation from the lamp assembly 100/200, the inner surface of the ceiling facing the carriage(s) may be radiation absorbent, for example it may be black.

The deflector may take any of the variants described above in relation to FIGS. 11A to 12B when implemented on the carriage 30 (or one or both of the carriages 31_1, 30_2) and/or in the apparatus 1.

The function of the various lamp assemblies 100 may vary during the process of building the object, simply by altering the power of the lamp 110. The preheat function may result in a smaller vaporisation front than the sintering function. As a result, the shield, or shields, may need to be located closer to a lamp used solely as preheat lamp compared to the shield(s) location with respect to a sintering lamp, so as to ensure that the shield(s) of the preheat lamp remain reflective. Alternatively, the lamp power of the preheat lamp may temporarily be increased during maintenance so as to pyrolise and clean the shields.

The outer shield may be of the same shape and size as the inner shield, however this is not essential and the relative shape and size will depend on the requirements of the apparatus.

The infrared lamp need not be a tube lamp spanning the direction of elongation of the assembly. Instead, a series of IR lamps may be arranged to form a row representing the elongate infrared lamp. Within the apparatus 1, the purpose of the elongate configuration is to span the width of the build bed surface 12 so as to provide homogeneous irradiation to all parts along the width of the build bed surface 12, and this may be achieved by a single lamp or by multiple lamps spanning the width of the build bed surface 12.

The invention claimed is:

1. An apparatus for the formation of three-dimensional objects by consolidation of particulate material, the apparatus comprising a working space, the working space comprising:
   a build bed surface of particulate material arranged at a lower surface bounding the working space, and a ceiling arranged at an upper surface bounding the working space; and
   a carriage for moving across the build bed surface, the carriage comprising:
   an elongate infrared lamp extending along a lamp axis;
   an elongate shield extending parallel to and along one side of the lamp axis, wherein the elongate shield is mounted so as to at least partially bound the space to one side of the lamp; and
   lower opening below the lamp and an upper opening above the lamp, such that radiation generated by the lamp is able to radiate through the lower opening whereintowards the build bed surface, and wherein the elongate shield comprises a dominant surface arranged so as to reflect direct lamp radiation, and lamp radiation reflected back from the build bed surface into the lower opening, towards and out of the upper opening into the working space and towards the ceiling.

2. The apparatus according to claim 1, wherein the dominant surface predominantly comprises an elongate planar metal sheet that extends vertically upwards from the lower opening to the upper opening.

3. The apparatus according to claim 2, wherein the elongate shield is a first elongate shield, and the apparatus further comprises a second elongate shield extending along the side of the lamp opposite the first elongate shield, wherein the second elongate shield comprises a second dominant surface arranged so as to reflect direct lamp radiation and lamp radiation reflected back from the build bed surface into the lower opening, towards and out of the upper opening.

4. The apparatus of according to claim 1, wherein the carriage is a first carriage, and the apparatus further comprises a second carriage to which a deflector lamp assembly is mounted, the second carriage being independently movable from the first carriage, wherein the deflector lamp assembly comprises a radiation deflector and a deflector elongate infrared lamp extending along a deflector lamp axis, the radiation deflector comprising:
   opposing first and second elongate side walls; and
   an upper deflector opening and a lower deflector opening arranged to pass deflector lamp radiation to an exterior of the radiation deflector;
   wherein the first and second elongate side walls comprise a first elongate mirror and a second elongate mirror extending parallel to the deflector lamp axis and along at least a lower internal portion of the respective first and second side walls;
   wherein the deflector lamp axis extends along and between the first mirror and the second mirror, the first and second mirrors each having a concave surface with respect to the deflector lamp axis; and
   wherein the first mirror is an upward deflecting mirror and further arranged to be concave with respect to the upper deflector opening for redirecting at least a portion of direct deflector lamp radiation through the upper deflector opening; and
   wherein the radiation deflector is mounted to the carriage so that, in use, the lower deflector opening passes radiation towards the build bed surface and the upper deflector opening passes radiation into the working space and, optionally, towards the ceiling.

5. The apparatus according to claim 4, wherein the radiation deflector is arranged such that the direction of the parallel radiation forms an acute angle with respect to the perpendicular to the ceiling.

6. The apparatus according to claim 3, wherein the dominant surfaces of the elongate shields are parallel to one another.

7. The apparatus according to claim 1, wherein the elongate shield is located at least partially within the lamp vaporisation front.

8. The apparatus according to claim 1, wherein the upper opening comprises a series of crosswise struts extending across the upper opening and defining a group of upper sub openings.

9. The apparatus according to claim 8, further wherein each of the struts of the series of crosswise struts extends upward away from the upper opening to form a series of planar guards extending away from the lamp so as to allow radiation to pass through the upper sub openings.

10. An apparatus for the formation of three-dimensional objects by consolidation of particulate material comprising a working space, the working space comprising:
   a build bed surface of particulate material arranged at a lower surface bounding the working space, and a ceiling arranged at an upper surface bounding the working space; and
   a carriage to which a lamp assembly is mounted and for passing the lamp assembly across the build bed surface, the lamp assembly comprising:
   an elongate infrared lamp extending along a lamp axis, and
   an elongate shield extending parallel to and along one side of the axis of the lamp,
   elongate shield is located between the lamp and surfaces of the carriage facing the lamp and at least partially bounds the space to one side of the lamp, and wherein the lamp assembly provides a lower opening below the lamp to allow radiation to pass towards the build bed surface and an upper opening, wherein the elongate shield comprises a dominant surface arranged so as to reflect direct lamp radiation, and the lamp radiation reflected back from the build bed surface into the lower opening, towards and out of the upper opening into the working space and towards the ceiling.

11. The apparatus according to claim 10, wherein the elongate shield, during operation of the lamp, reaches a pyrolysis temperature of 300° C. or more.

12. The apparatus according to claim 10, wherein the surface of the carriage facing the lamp is located next to the elongate shield such that a gap exists that allows a convection flow, so that, during operation of the lamp, the surface of the carriage facing the lamp remains below the melting point of the particulate material.

13. The apparatus according to claim 10, wherein the ceiling comprises a heat sink.

14. The apparatus according to claim 10, wherein the elongate shield predominantly comprises an elongate planar metal sheet that extends vertically upwards from the lower opening to the upper opening.

15. The apparatus according to claim 14, wherein the elongate shield is a first elongate shield, and the apparatus further comprises a second elongate shield extending along the side of the lamp opposite the first elongate shield, wherein the second elongate shield predominantly comprises an elongate planar dominant surface that extends vertically upwards from the lower opening to the upper opening.

16. An apparatus for the formation of three-dimensional objects by consolidation of particulate material, the apparatus comprising a working space, the working space comprising:
   a build bed surface of particulate material arranged at a lower surface bounding the working space, and a ceiling arranged at an upper surface bounding the working space; and
   a carriage comprising a plurality of lamp assemblies, each lamp assembly comprising:
   an elongate infrared lamp; and
   an elongate shield extending parallel to and along one side of the axis of the lamp so as to at least partially bound the space to one side of the lamp, such that each lamp assembly provides a lower opening below the lamp to allow radiation from the lamp to pass towards the build bed surface, and an upper opening above the lamp, wherein the elongate shield comprises a dominant surface arranged so as to reflect direct lamp radiation, and lamp radiation reflected back from the build bed surface into the lower opening, towards and out of the upper opening into the working space and towards the ceiling.

17. The apparatus of claim 16, wherein, in each lamp assembly of a plurality of lamp assemblies, the elongate shield is a first elongate shield, and each lamp assembly further comprises a second elongate shield extending along the side of the lamp opposite the first elongate shield, wherein the second elongate shield comprises a second dominant surface arranged so as to reflect direct lamp radiation, and lamp radiation reflected back from the build bed surface into the lower opening, towards and out of the upper opening into the working space and towards the ceiling.

18. The apparatus of claim 16, wherein the upper opening of each lamp assembly comprises a series of crosswise struts extending across the upper opening and defining a group of upper sub openings, wherein each of the struts of the series of crosswise struts extends upward away from the upper opening to form a series of planar guards extending away from the lamp so as to allow radiation to pass through the upper sub openings.

19. The apparatus of claim 16, further comprising a printing module, wherein the printing module is arranged between two of the plurality of lamp assemblies, and wherein the elongate shield of each lamp assembly is arranged so as to create a gap between the elongate shield and a surface of the printing module facing the elongate shield so as to allow a convection flow from the build bed surface to pass into the working space and towards the ceiling.

20. The apparatus of claim 16, further comprising a second carriage comprising a further lamp assembly, the further lamp assembly comprising:
   a further elongate infrared lamp; and
   a further elongate shield extending parallel to and along one side of the axis of the further lamp so as to at least partially bound the space to one side of the further lamp, such that the further lamp assembly provides a further lower opening below the further lamp to allow radiation from the further lamp to pass towards the build bed surface, and a further upper opening above the further lamp, wherein the further elongate shield comprises a further dominant surface arranged so as to reflect direct lamp radiation, and lamp radiation reflected back from the build bed surface into the further lower opening, towards and out of the further upper opening into the working space and towards the ceiling.

* * * * *